(12) United States Patent
de Vos et al.

(10) Patent No.: US 12,139,587 B2
(45) Date of Patent: Nov. 12, 2024

(54) METHOD FOR CREATING A POROUS FILM THROUGH AQUEOUS PHASE SEPARATION

(71) Applicant: NX Filtration N.V., Enschede (NL)

(72) Inventors: Wiebe Matthijs de Vos, Enschede (NL); Joshua David Willot, Enschede (NL); Wouter Martinus Nielen, Enschede (NL)

(73) Assignee: NX FILTRATION N.V., Enschede (NL)

( * ) Notice: Subject to any disclaimer, the term of this patent is extended or adjusted under 35 U.S.C. 154(b) by 812 days.

(21) Appl. No.: 17/291,289

(22) PCT Filed: Nov. 7, 2018

(86) PCT No.: PCT/NL2018/050742
§ 371 (c)(1),
(2) Date: May 5, 2021

(87) PCT Pub. No.: WO2020/096446
PCT Pub. Date: May 14, 2020

(65) Prior Publication Data
US 2022/0002508 A1    Jan. 6, 2022

(51) Int. Cl.
*C08J 5/18*           (2006.01)
*B01D 67/00*          (2006.01)
(Continued)

(52) U.S. Cl.
CPC ............. *C08J 5/18* (2013.01); *B01D 67/0011* (2013.01); *B01D 67/00165* (2022.08);
(Continued)

(58) Field of Classification Search
CPC ........ C08J 5/18; C08J 9/142; C08J 2201/026; C08J 2203/12; B01D 69/08; B01D 69/12;
(Continued)

(56) References Cited

U.S. PATENT DOCUMENTS 3,549,016 A * 12/1970 Rigopulos ............... C08L 25/18
                                                    210/500.33
4,767,645 A    8/1988 Linder
(Continued)

FOREIGN PATENT DOCUMENTS

| CN | 103755979 B * | 1/2016 | |
| WO | WO-2011060631 A1 * | 5/2011 | ............ B01D 69/08 |
| WO | WO2017043233 A1 | 3/2017 | |

OTHER PUBLICATIONS

Nunes Block copolymer membranes for aqueous solution applications, Macromolecules, 2012, vol. 49, No. 8, 2905-2916 (Year: 2012).*

(Continued)

*Primary Examiner* — Michael M. Bernshteyn
(74) *Attorney, Agent, or Firm* — KDW Firm PLLC

(57) ABSTRACT

The invention relates to a method for creating a porous film through aqueous phase separation, the method comprising: i) providing an aqueous solution comprising a responsive copolymer, and optionally a charged polymer, wherein at least one of the monomers in the responsive copolymer is a responsive monomer; ii) forming the aqueous solution into a thin layer and contacting the thin layer of aqueous solution with an aqueous coagulation solution in which the responsive copolymer is not soluble, or contacting the thin layer of aqueous solution with an aqueous coagulation solution in which a complex comprising the responsive copolymer and the charged polymer is not soluble; and iii) allowing solvent (Continued)

exchange between the aqueous solution and the aqueous coagulation solution to produce a porous film. The invention further relates to porous films or membranes thus obtained.

14 Claims, 5 Drawing Sheets

(51) Int. Cl.
| | |
|---|---|
| *B01D 69/08* | (2006.01) |
| *B01D 69/12* | (2006.01) |
| *B01D 71/40* | (2006.01) |
| *B01D 71/76* | (2006.01) |
| *C08J 9/14* | (2006.01) |

(52) U.S. Cl.
CPC ............ *B01D 69/08* (2013.01); *B01D 69/12* (2013.01); *B01D 71/40* (2013.01); *B01D 71/76* (2013.01); *C08J 9/142* (2013.01); *B01D 2323/081* (2022.08); *B01D 2323/18* (2013.01); *B01D 2323/22* (2013.01); *B01D 2323/30* (2013.01); *B01D 2323/40* (2013.01); *B01D 2325/02* (2013.01); *C08J 2201/026* (2013.01); *C08J 2203/12* (2013.01)

(58) Field of Classification Search
CPC .... B01D 71/76; B01D 71/40; B01D 67/0011; B01D 67/00165; B01D 2323/18; B01D 2323/22; B01D 2323/30; B01D 2323/40; B01D 2323/081; B01D 2325/02
USPC ......................................................... 521/65
See application file for complete search history.

(56) References Cited

U.S. PATENT DOCUMENTS

| 4,787,645 | A  | * | 11/1988 | Ohbayashi | ............. | B62D 7/146 |
|---|---|---|---|---|---|---|
| | | | | | | 280/124.136 |
| 2009/0173694 | A1 | * | 7/2009 | Peinemann | ............ | B01D 69/02 |
| | | | | | | 210/500.21 |
| 2016/0325256 | A1 | * | 11/2016 | Abrahamsson | ...... | B01J 13/0056 |
| 2017/0327649 | A1 | * | 11/2017 | Wiesner | ............... | B01D 71/262 |

OTHER PUBLICATIONS

Nunes et al. "Block copolymer membranes for aqueous solution applications", Macromolecules, 2012, vol. 49, No. 8, 2905-2916 (Year: 2012).*

Liat et al. "Characterization of Block Copolymer Self-Assembly: From Solution to Nanoporous Membranes", Macromolecules, 2012, vol. 45, No. 24, 9631-9642 (Year: 2012).*

Suzana Pereira Nunes: Block Copolymer Membranes for Aqueous Solution Applications, Macromolecules, vol. 49, No. 8, Mar. 22, 2016, pp. 2905-2916. ISSN: 0024-9297, DOI:10.1021/acs.macromol. 5b02579.

Liat Oss-Ronen et al: "Characterization of Block Copolymer Self-Assembly: From Solution to Nanoporous Membranes", Macromolecules, vol. 45, No. 24, Dec. 21, 2012, pp. 9631-9642, ISSN: 0024-9297, DOI: 10.1021/ma301611c.

Reuvers, A. J., J. W. A. Van den Berg, and CAm Smolders. "Formation of membranes by means of immersion precipitation: Part I. A model to describe mass transfer during immersion precipitation." Journal of membrane science 34.1 (1987): 45-65.

De Grooth, Joris, et al. "The role of ionic strength and odd-even effects on the properties of polyelectrolyte multilayer nanofiltration membranes." Journal of membrane science 475 (2015): 311-319.

* cited by examiner

A

B

C

D

E

F

G

H

A

B

C

D

E

F

G

METHOD FOR CREATING A POROUS FILM THROUGH AQUEOUS PHASE SEPARATION

FIELD OF THE INVENTION

The invention is in the field of methods for preparing copolymer films, and of such copolymer films. The method involves phase separation and requires only aqueous solutions, eliminating the need for organic solvents.

BACKGROUND OF THE INVENTION

Polymer films find use in various fields. An important type of film is a membrane, which in the context of this invention is a polymer film that separates two environments. A porous membrane can effect separations by allowing selective passage of substances from one environment to the other. An example is the purification of water, where a membrane separates waste water from purified water, where water molecules are able to pass through the membrane, leaving waste solutes behind.

Membrane technology is presently used on huge scales for the production of drinking water, the treatment of waste water, the separation of chemicals, for instance for biomedical applications etc. Many tens of millions of square meters of membrane material are produced each year, allowing for sales worth many billions of US dollars. This is striking in light of the young age of membrane technology, as just 50 years ago membranes were only used on very small scales in laboratories and hospitals.

Historically, the big breakthrough for membrane technology came with the development of non-solvent induced phase separation (NIPS) in 1962 (Loeb, S.; Sourirajan, S. Advances in Chemistry Series, 1962, 38, 117). With NIPS it became possible to produce, in a continuous process, defect free membranes with an asymmetric structure. NIPS can be used to create membranes in the form of sheets, or in the form of hollow fibres (WO 2017/043233). These membranes consist of an ultrathin and highly selective skin layer but are supported by a much more permeable microporous support that provides mechanical strength. The asymmetric structure allows a flux that is a factor 10 higher than any reverse osmosis membrane developed before, while retaining excellent salt rejection characteristics. NIPS made membranes a potentially practical method for desalting water but also showed a clear path to create better and cheaper membranes for other applications. Currently, NIPS is the dominant technique to produce (polymeric) membranes, sometimes in combination with other techniques such an interfacial polymerization.

In the traditional NIPS process the starting point is a polymer such as poly(ether sulfone) (PES) dissolved in a solvent, often N-methylpyrrolidon (NMP), at a high polymer concentration. A thin film of the polymer solution is cast on a substrate and is then immersed in a suitable non-solvent, for example water or water mixed with NMP. After immersion, an immediate exchange takes place where solvent diffuses into the non-solvent bath (with a given flux) and the non-solvent penetrates the cast film of polymer solution. The polymer solution then comes into the metastable regime and later in the unstable regime, and precipitation of the polymers can occur during both these regimes. Initially the precipitate might be in the form of a gel or a liquid-like structure, until real solidification sets in after more solvent exchange. The diluted phase, mixture of solvent and non-solvent, influences the porosity in the membrane while the solidified polymer forms the membrane matrix (Reuvers et al., J. membrane Sci. 1987, 34, 45).

A strength of NIPS is that within the polymer solution the kinetics of precipitation differs for different locations. At the top of the cast polymer solution, where the initial contact is made between the solvent and the non-solvent, precipitation will be very fast leading to the formation of very small pores or even a dense skin layer. However, this precipitated surface structure slows the further exchange of solvent and non-solvent. The kinetics of precipitation deeper within the membrane will therefore be slower leading to a much more open structure. The asymmetric structure, with a very thin and highly selective skin layer, supported by a much thicker and much more open substructure is thus a common result of this approach to membrane production. Furthermore, variation in the polymer concentration, temperature and additionally the composition (solvent to non-solvent ratio) of the polymer solution and the coagulation bath, allows for control over the kinetics of precipitation and thus the resulting membrane structure.

NIPS has been successfully used to create asymmetric membranes with dense top layers for reverse osmosis, gas separation and nanofiltration, asymmetric porous films for ultrafiltration (pore size 5-100 nm) and asymmetric and symmetric porous films for microfiltration (pore size 100-1000 nm).

Unfortunately, the aprotic solvents that NIPS relies on are expensive, partly flammable and, more importantly, they can be harmful (e.g. reprotoxic) to humans and the environment. Due to costs and environmental legislation these solvents have to be recycled, requiring an expensive closed cycle of process streams. Furthermore, residual solvent has to be fully removed from the membrane before it can be used for the production of drinking water.

The complexation of oppositely charged polyelectrolytes is well known to be able to lead to an insoluble polymer phase. Polyelectrolyte complexes are already successfully used in membrane technology. They are prepared by alternatively coating a support membrane with polycations and polyanions leading to the build-up of a dense polyelectrolyte multilayer on top of the support (De Grooth, J., et al. J. Membrane Science, 2014, 475, 311). Polyelectrolyte multilayer membranes have shown excellent separation properties for reverse osmosis and nanofiltration, but possess downsides in that many time consuming coating steps are necessary for their preparation, and that a (NIPS based) support membrane is required.

SUMMARY OF THE INVENTION

It is an object of the present invention to provide improved methods for producing porous films. It is an object of the present invention to provide methods that reduce, and preferably eliminate, the use of harmful organic solvents in the preparation of porous films by for example reducing the amount of organic solvents used, by replacing harmful organic solvents by non-harmful organic solvents or by a combination of both. It is an object of the present invention to provide safer methods for producing porous films. It is an object of the present invention to provide methods with reduced impact on the environment for producing porous films. It is an object of the present invention to provide methods with reduced use of harmful substances for producing porous films.

In a first aspect the invention relates to a method for creating a porous film through aqueous phase separation comprising:

i) providing an aqueous solution comprising a responsive copolymer, and optionally a charged polymer, wherein at least one of the monomers in the responsive copolymer is a responsive monomer;

ii) forming the aqueous solution into a thin layer and contacting the thin layer of aqueous solution with an aqueous coagulation solution in which the responsive copolymer is not soluble, or contacting the thin layer of aqueous solution with an aqueous coagulation solution in which a complex comprising the responsive copolymer and the charged polymer is not soluble; and iii) allowing solvent exchange between the aqueous solution and the aqueous coagulation solution to produce a porous film.

This method produces porous films such as membranes without the need for harmful organic solvents and preferably without any need for organic solvents. An important underlying principle is that water can act as both a solvent and as a non-solvent for certain responsive monomers, responsive copolymers and complexes comprising responsive copolymers, surprisingly allowing for an entirely aqueous phase separation process.

For some responsive copolymers, a transition from soluble to insoluble is possible in an aqueous environment free of harmful organic solvents as well as in a completely aqueous environment, for example by a change in pH, temperature (T) or salt concentration (Csalt). This allows one to follow the long established procedures used for NIPS, but under completely aqueous conditions. This approach, Aqueous Phase Separation (APS) retains the key strengths of the NIPS approach, allows control over film structure, without requiring any harmful organic solvents. This makes the approach an appealing and sustainable alternative to traditional film production.

In preferred embodiments, feature ii) of the method can be further detailed into iia) applying the aqueous solution comprising a responsive copolymer, and optionally a charged polymer, wherein at least one of the monomers in the responsive copolymer is a responsive monomer, on a surface to create a coated surface, wherein the surface is coated with the aqueous solution; and iib) immersing the coated surface in an aqueous coagulation bath comprising the aqueous coagulation solution in which the responsive copolymer or complex comprising the responsive copolymer and the charged polymer is not soluble. Preferably, this surface is selected from the group consisting of a glass surface, a polytetrafluoroethylene (PTFE) surface, a polypropylene surface, and a porous surface such as a nonwoven surface. Preferably, the coated surface comprises a support layer. Preferably, the coating is applied by casting.

In other preferred embodiments, feature ii) can be further detailed into iia) forming a tube of the aqueous solution comprising a responsive copolymer, and optionally a charged polymer, wherein at least one of the monomers in the responsive copolymer is a responsive monomer and wherein the tube is filled with a further aqueous solution; and iib) immersing the tube of the aqueous solution comprising a responsive copolymer, and optionally a charged polymer, in an aqueous bath wherein the aqueous bath and/or the further aqueous solution in the tube comprises the aqueous coagulation solution in which the responsive copolymer or complex comprising the responsive copolymer and the charged polymer is not soluble. Preferably the tube of the aqueous solution comprising a responsive copolymer, and optionally a charged polymer, is formed using a spinneret.

In preferred embodiments, the responsive copolymer is selected from the group consisting of poly(4-vinyl pyridine)-co-poly(styrene) and poly(4-vinyl pyridine)-co-poly(butyl methacrylate). In another preferred embodiment the responsive copolymer is a block copolymer, such as poly(styrene)-block-poly(maleic acid). In yet another preferred embodiment the responsive copolymer is an alternating copolymer, such as poly(styrene-alt-maleic acid).

In preferred embodiments, the method further comprises crosslinking the porous film. Preferably, this crosslinking is via dihaloalkanes such as 1,4-dichlorobutane or 1,6-dibromohexane, diamines such as ethane-1,2-diamine, propane-1,3-diamine, putrescine, cadaverine, hexane-1,6-diamine, via heating of the porous film, or via radiation such as an ion beam. Alternatively the membrane can be crosslinked using a polyamine (e.g. poly(allylamine) (PAH) or polyethyleneimine (PEI)), a di-alcohol or a polyalcohol (poly vinyl alcohol), or di- or tri-epoxy's.

In preferred embodiments, the aqueous copolymer solution comprises further additives, wherein the further additives are selected from the group consisting of a polypeptide, a nanoparticle, and a macromolecule. Preferably, the porous film that is created is a catalytic film, wherein the further additive is an enzyme or a catalytic nanoparticle. Preferably, the porous film that is created is an ion binding or ion transporting film, wherein the further additive is a crown ether.

In preferred embodiments, the porous film that is created is an asymmetric porous film. Preferably, the method comprises the additional actions of: selecting a suitable concentration for the responsive copolymer, or selecting a suitable temperature for ii), or selecting a suitable temperature for iii), or selecting a suitable coagulation solution.

In a second aspect, the invention relates to the porous films that are obtainable by a method of the first aspect. Preferably, these films are porous membranes or asymmetric porous membranes. They can be two-dimensional films or hollow fibres.

DETAILED DESCRIPTION OF THE INVENTION

In a first aspect the invention relates to a method for creating a porous film through aqueous phase separation, the method for creating a porous film through aqueous phase separation comprising:

i) providing an aqueous solution comprising a responsive copolymer, and optionally a charged polymer, wherein at least one of the monomers in the responsive copolymer is a responsive monomer;

ii) forming the aqueous solution into a thin layer and contacting the thin layer of aqueous solution with an aqueous coagulation solution in which the responsive copolymer is not soluble, or contacting the thin layer of aqueous solution with an aqueous coagulation solution in which a complex comprising the responsive copolymer and the charged polymer is not soluble; and iii) allowing solvent exchange between the aqueous solution and the aqueous coagulation solution to produce a porous film.

This method is referred to hereinafter as a method according to the invention. The porous films that are created with such a method are referred to herein as porous films according to the invention.

In the context of this invention, aqueous is to be construed as being predominantly water-based. Given how it is an object of the invention to reduce the need for harmful organic solvents, preferably water is the only solvent in the multicomponent aqueous mixture. Accordingly, throughout this application, the term aqueous refers to a solution wherein at least 50, 60, 70, 80, 90, 91, 92, 93, 94, 95, 96, 97, 98, 98.2, 98.4, 98.6, 98.8, 99, 99.1, 99.2, 99.3, 99.4, 99.5, 99.6, 99.7, 99.8, 99.9, or more percent of the solvent is water, or wherein substantially 100% of the solvent is water. However, as some organic solvents may have beneficial effects as additives, they may nonetheless be present. When organic solvents are used, they are preferably not harmful, not hazardous, environmentally friendly and/or non-toxic organic solvents such as formic acid, acetic acid, propionic acid, and butyric acid. Hazardous solvents or substances may be defined as those which are labelled according to the harmonized CLP regulation.

In the context of this invention, a solution is a mixture comprising at least water and other chemicals such as a responsive copolymer, wherein at least part of the responsive copolymer is dissolved in the aqueous solution, preferably at least 70, 75, 80, 85, 90, 95, 96, 97, 98, 99, or 100% of the responsive copolymer is dissolved in the aqueous solution. Preferably, the solution is a homogeneous mixture, but it can also be a suspension or an emulsion. In preferred embodiments, no non-dissolved components are present. The aqueous solution comprising the responsive copolymer may also be referred to as the aqueous copolymer solution.

It is understood that a copolymer refers to a polymer comprising two or more species of monomer. Throughout this text the mention of monomer normally refers to a species of monomer. The copolymer used in the method or in the porous film according to the invention is a responsive copolymer comprising at least one responsive monomer. A responsive monomer or copolymer refers to a monomer or copolymer that changes its state depending on the properties of the solution in which it is dissolved. In other words the responsive monomer or copolymer responds to a change in the properties of the solution in which it is dissolved. For example a responsive monomer or copolymer may be charged or uncharged depending on the properties of the solution in which it is dissolved. Alternatively or additionally it may be soluble or insoluble in a solution depending on the properties of said solution. A change in one or more of the solution properties can cause the monomer or the polymer to go from soluble to insoluble or from insoluble to soluble. In the art the term solvent quality is often used to indicate how the solution properties or changes in solution properties influence the solubility of a polymer or of a copolymer. A decrease of the solvent quality implies that at least one parameter of the solvent is changed causing the copolymer to become less soluble. An increase of the solvent quality implies that at least one parameter of the solvent is changed causing the copolymer to become more soluble.

Preferably the one or more solution properties to which the monomer and/or copolymer responds, and which therefore determine the solvent quality, are selected from the group consisting of pH, temperature (T), and/or solute concentration (Csol) such as salt concentration (Csalt) or acid concentration (Cacid). A skilled person will be able to establish how a responsive copolymer responds to changes in a particular parameter. A change in solubility leads to a change in opacity of the aqueous polymer solution, and can for example be monitored via UV-VIS transmission spectroscopy. The change in solubility allows the dissolved responsive copolymer to become insoluble, and potentially to form a film. In preferred embodiments, a responsive copolymer precipitates or forms a gel in response to the change in parameters, or at least undergoes a phase transition in response to the change in parameters.

The charged polymer may be a responsive or a non-responsive charged polymer. In a preferred embodiment the charged polymer is a non-responsive charged polymer.

As the main building block of the method according to the invention is a responsive copolymer, the resulting films may retain certain responsive properties, forming responsive films such as responsive membranes. Here a change in solution properties such as a change in pH or ionic strength can provide control over film properties, such as the separation properties of a porous membrane. Alternately, switching a film between a hydrophobic and a hydrophilic state can aid with membrane cleaning.

A preferred solution property used to change the solvent quality is the temperature by at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 55, 60, 65, 70, 75, 80, 85, 90, 95, or 100 degrees Celsius or more. A skilled person can establish a suitable temperature difference by assessing the response of a responsive copolymer. Examples of responsive copolymers that respond to a change in temperature are copolymers that have a known lower critical solution temperature (LCST) or upper critical solution temperature (UCST). Examples of monomers that are responsive to temperature changes are N-isopropylacrylamide (NIPAM), 2-(dimethylamino)ethyl methacrylate (DMAEMA), (oligoethylene glycol)acrylate (OEA), (oligoethylene glycol)acrylamide (OEAAm), (oligoethylene glycol)methacrylate (OEMA), and (oligoethylene glycol)acrylamide (OEMAAm). Temperature responsive copolymers include copolymers having one or more temperature responsive monomers. Preferred temperature responsive copolymers are copolymers comprising a temperature responsive monomer and a further hydrophobic monomer.

A further preferred solution property used to change the solvent quality is an increase or decrease in pH by at least 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.5, 6.0, 6.5, 7.0, 7.5, 8.0, 8.5, 9.0, 9.5, or 10.0, 10.5, 11.0, 11.5, 12.0, 12.5, 13.0, 13.5, or 14.0 units or more. Preferably, such an increase or decrease is in the range of 2 to 6 pH units, more preferably in the range of 3 to 4 pH units. A skilled person can establish a suitable pH difference by assessing the response of a responsive monomer or copolymer taking account of $pK_a$ values of the responsive monomer or responsive copolymer. Examples of such pH responsive monomers are 2-diethylaminoethylmethacrylate (DEA), 4-vinylpyridinium (4VP), aminostyrene (AS), ethylene imine (EI), allylamine (AH), 2-(dimethylamino)ethyl methacrylate (DMAEMA), diallyldimethyl-ammonium chloride (DADMAC), (methacrylic acid) (MAA), acrylic acid (AA), maleic acid (MA), styrenesulfonate (SS), vinyl siloxane (VS), sulfonated polyethersulfone (sES), sulfonated polysulfone (sSU). pH Responsive copolymers include copolymers having one or more pH responsive monomers. Preferred pH responsive copolymers are copolymers comprising a pH responsive monomer and a further hydrophobic monomer. Examples of suitable copolymers include poly(methacrylic acid)-co-(methyl methacrylate) (PMAA-co-PMMA) and poly(styrene)-co-(maleic acid) (PS-co-PMA).

A further preferred solution property used to change the solvent quality is an increase or decrease in solute concentration such as salt concentration by at least 1, 2, 3, 4, 5, 10, 15, 20, 25, 30, 35, 40, 45, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 420, 440, 460, 480, 500, 520, 540, 560, 580, 600, 620, 640, 660, 680, 700, 720, 740, 760, 780, 800, 820, 840, 860, 880, 900, 920, 940, 960, 980, or 1000 mM, or 1, 1.5, 2, 2.5, 3, 3.5, 4, 4.5, 5, 5.5, 6, 6.5, 7, 7.5, or 8 M or more. Preferably a difference in salt concentration is at most 6 M or 5 M, such as from 0 M to 5 M, or from 5 M to 0 M. Examples of suitable salts are NaCl, KCl, $Na_3PO_4$, $Na_2HPO_4$, $NaH_2PO_4$, a calcium phosphate, apatites such as hydroxylapatite, $NaCO_3$, $NaHCO_3$, $KHSO_4$, $CsCO_3$, $Na_2SO_4$, $K_2SO_4$, $NaHSO_4$, $MgSO_4$, $MgCL_2$, $CaCl_2$, $CaCO_3$. A skilled person can establish suitable salts and concentration differences by assessing the response of a responsive copolymer.

Examples of salt responsive monomers include chitosan, sulfobetaine (SBMA), and diallyldimethylammonium chloride (DADMAC). Salt responsive copolymers include copolymers having one or more salt responsive monomers. Preferred salt responsive copolymers are copolymers comprising a salt responsive monomer and a further hydrophobic monomer. Controlling the salt concentration is a preferred way to change the solvent quality when more than one responsive copolymer is present in the aqueous copolymer solution, preferably when oppositely charged polyelectrolytes are present, more preferably in a 1:1 ratio based on monomers as described elsewhere herein.

A further preferred way to change the solvent quality is an increase or decrease in solute concentration such as acid concentration by at least 1, 2, 3, 4, 5, 10, 15, 20, 25, 30, 35, 40, 45, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 420, 440, 460, 480, 500, 520, 540, 560, 580, 600, 620, 640, 660, 680, 700, 720, 740, 760, 780, 800, 820, 840, 860, 880, 900, 920, 940, 960, 980, or 1000 mM or more. Examples of suitable salts are acetic acid, phosphoric acid, trifluoroacetic acid, formic acid, propionic acid, citric acid, glycolic acid, trichloroacetic acid, tosylic acid, mesylic acid, and other sulphates or carboxylates with a molecular weight of less than 500, 400, 300, 250, or 200 Da. A skilled person can establish suitable acid and concentration differences by assessing the response of a responsive copolymer.

Preferably, upon response to a change in solvent quality, at least 50, 60, 70, 80, 90, 91, 92, 93, 94, 95, 96, 97, 98, 98.2, 98.4, 98.6, 98.8, 99, 99.1, 99.2, 99.3, 99.4, 99.5, 99.6, 99.7, 99.8, 99.9, or 100% percent of a responsive copolymer undergoes a phase transition. This can be immediately after the trigger occurs, or within at least 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 55, 60 seconds, or 2, 3, 4, 5, 6, 7, 8, 9, 10, 15, 30, 45 minutes, or 1, 2, 3, 4, 5, 6, 7, 8, 9, 11, 12, or 24 hours or more. The amount of responsive copolymer that underwent a phase transition can be assessed by quantifying the amount of copolymer that is still in solution after the change in solvent quality has occurred, for example via UV-VIS techniques, or via chromatography such as HPLC or GPC A responsive copolymer is a polymer that comprises a further monomer in addition to a first responsive monomer. In case of two different monomers, these can be present in any molar ratio, for example a ratio ranging from 1:10 to 10:1, provided that the copolymer exhibits responsive behaviour. A copolymer can be a random copolymer where the monomers are randomly distributed along the polymer chain, a block copolymer where continuous stretches of the first monomer are linked to continuous stretches of the further monomer or monomers, or it can be an alternating copolymer where the different monomers follow a regularly alternating scheme.

Preferably the responsive copolymer comprising at least 1 responsive monomer further comprises a non-responsive monomer that is not soluble in the aqueous solvent (i.e. a hydrophobic monomer). Examples of non-responsive monomers that are not soluble in an aqueous solvent include styrene, ethylene, propylene, 1-hexene, 1-octene, 1-decene, 1-dodecene, 1-tetradecene, 1-octadecene, butadiene, isobutylene, tetrafluoroethylene, difluoroethylene, stilbene, acenapthylene.

In preferred embodiments, the responsive copolymer is a poly(styrene-co-maleic acid) (PS-MA), poly(styrene-co-acrylic acid) (PS-AA), poly(styrene-co-methacrylic acid) (PS-MAA), poly(styrene-co-4-hydroxystryrene) (PS-4HS), poly(styrene-co-4-vinylpyridine) (PS-4VP), poly(styrene-co-allylamine) (PS-ALA), poly(styrene-co-4-aminostyrene) (PS-4AS), poly(stilbene-co-maleic acid) (PSB-MA), poly(stilbene-co-acrylic acid) (PSB-AA), poly(stilbene-co-4-vinylpyridine) (PSB-4VP), poly(stilbene-co-allylamine) (PSB-ALA), poly(stilbene-co-4-aminostyrene) (PSB-4AS), poly(acenaphthylene-co-maleic acid) (PAN-MA), poly(acenapthylene-co-acrylic acid) (PAN-AA), poly(acenapthylene-co-allylamine) (PAN-ALA), poly(acenaphthylene-co-4-aminostyrene) (PAN-4AS), poly(isobutylene-co-maleic acid) (PIB-MA), poly(isobutylene-co-acrylic acid) (PIB-AA), poly(isobutylene-co-methacrylic acid) (PIB-MAA), poly(isobutylene-co-4-hydroxystryrene) (PIB-4HS), poly(isobutylene-co-4-vinylpyridine) (PIB-4VP), poly(isobutylene-co-allylamine) (PIB-ALA), poly(isobutylene-co-4-aminostyrene (PIB-4AS), poly(1-octadecene-co-maleic acid) (POD-MA), poly(1-octadecene-co-acrylic acid) (POD-AA), poly(1-octadecene-co-methacrylic acid) (POD-MAA), poly(1-octadecene-co-4-hydroxystryrene) (POD-4HS), poly(1-octadecene-co-4-vinylpyridine) (POD-4VP), poly(1-octadecene-co-allylamine) (POD-ALA), poly(1-octadecene-co-4-aminostyrene (POD-4AS), poly(1-tetradecene-co-maleic acid) (PTD-MA), poly(1-tetradecene-co-acrylic acid) (PTD-AA), poly(1-tetradecene-co-methacrylic acid) (PTD-MAA), poly(1-tetradecene-co-4-hydroxystryrene) (PTD-4HS), poly(1-tetradecene-co-4-vinylpyridine) (PTD-4VP), poly(1-tetradecene-co-allylamine) (PTD-ALA), poly(1-tetradecene-co-4-aminostyrene (PTD-4AS), poly(1-dodecene-co-maleic acid) (PDD-MA), poly(1-dodecene-co-acrylic acid) (PDD-AA), poly(1-dodecene-co-methacrylic acid) (PDD-MAA), poly(1-dodecene-co-4-hydroxystryrene) (PDD-4HS), poly(1-dodecene-co-4-vinylpyridine) (PDD-4VP), poly(1-dodecene-co-allylamine) (PDD-ALA), poly(1-dodecene-co-4-aminostyrene (PDD-4AS), poly(1-decene-co-maleic acid) (PD-MA), poly(1-decene-co-acrylic acid) (PD-AA), poly(1-decene-co-methacrylic acid) (PD-MAA), poly(1-decene-co-4-hydroxystryrene) (PD-4HS), poly(1-decene-co-4-vinylpyridine) (PD-4VP), poly(1-decene-co-allylamine) (PD-ALA), poly(1-decene-co-4-aminostyrene (PD-4AS), poly(1-octene-co-maleic acid) (PO-MA), poly(1-octene-co-acrylic acid) (PO-AA), poly(1-octene-co-methacrylic acid) (PO-MAA), poly(1-octene-co-4-hydroxystryrene) (PO-4HS), poly(1-octene-co-4-vinylpyridine) (PO-4VP), poly(1-octene-co-allylamine) (PO-ALA), poly(1-octene-co-4-aminostyrene (PO-4AS), poly(1-hexene-co-maleic acid) (PH-MA), poly(1-hexene-co-acrylic acid) (PH-AA), poly(1-hexene-co-methacrylic acid) (PH-MAA), poly(1-hexene-co-4-hydroxystryrene) (PH-4HS), poly(1-hexene-co-4-vinylpyridine) (PH-4VP), poly(1-hexene-co-allylamine) (PH-ALA), poly(1-hexene-co-4-aminostyrene (PH-4AS), poly(propylene-co-maleic acid) (PP-MA), poly(propylene-co-acrylic acid) (PP-AA), poly(propylene-co-methacrylic acid) (PP-MAA), poly(propylene-co-4-hydroxystryrene) (PP-4HS), poly(propylene-co-4-vinylpyridine) (PP-4VP), poly(propylene-co-allylamine) (PP-ALA), poly(propylene-co-4-aminostyrene (PP-4AS), poly(ethylene-co-maleic acid) (PE-MA), poly(ethylene-co-acrylic acid) (PE-AA), poly(ethylene-co-methacrylic acid) (PE-MAA), poly(ethylene-co-4-hydroxystryrene) (PE-4HS), poly(ethylene-co-4-vinylpyridine) (PE-4VP), poly(ethylene-co-allylamine) (PE-ALA), poly(ethylene-co-4-aminostyrene (PE-4AS), poly(tetrafluoroethylene-co-maleic acid) (PTFE-MA), poly(tetrafluoroethylene-co-acrylic acid) (PTFE-AA), poly(tetrafluoroethylene-co-methacrylic acid) (PTFE-MAA), poly(tetrafluoroethylene-co-4-hydroxystryrene) (PTFE-4HS), poly(tetrafluoroethylene-co-4-vinylpyridine) (PTFE-4VP), poly(tetrafluoroethylene-co-allylamine) (PTFE-ALA), poly(tetrafluoroethylene-co-4-aminostyrene (PTFE-4AS), poly(difluoroethylene-co-maleic acid) (PDFE-MA), poly(difluoroethylene-co-acrylic acid) (PDFE-AA), poly(difluoroethylene-co-methacrylic acid) (PDFE-MAA), poly(difluoroethylene-co-4-hydroxystryrene) (PDFE-4HS), poly(difluoroethylene-co-4-vinylpyridine) (PDFE-4VP), poly(difluoroethylene-co-allylamine) (PDFE-ALA), poly(difluoroethylene-co-4-aminostyrene (PDFE-4AS), poly(butadiene-co-maleic acid) (PBD-MA), poly(butadiene-co-acrylic acid) (PBD-AA), poly(butadiene-co-methacrylic acid) (PBD-MAA), poly(butadiene-co-4-hydroxystryrene) (PBD-4HS), poly(butadiene-co-4-vinylpyridine) (PBD-4VP), poly(butadiene-co-allylamine) (PBD-ALA), poly(butadiene-co-4-aminostyrene (PBD-4AS).

Particularly preferred copolymers are block copolymers, such as poly(styrene-block-maleic acid) (PS-block-MA), poly(styrene-block-acrylic acid) (PS-block-AA), poly(styrene-block-methacrylic acid) (PS-block-MAA), poly(styrene-block-4-hydroxystryrene) (PS-block-4HS), poly(styrene-block-4-vinylpyridine) (PS-block-4VP), poly(styrene-block-allylamine) (PS-block-ALA), poly(styrene-block-4-aminostyrene) (PS-block-4AS), poly(stilbene-block-maleic acid) (PSB-block-MA), poly(stilbene-block-acrylic acid) (PSB-block-AA), poly(stilbene-block-4-vinylpyridine) (PSB-block-4VP), poly(stilbene-block-allylamine) (PSB-block-ALA), poly(stilbene-block-4-aminostyrene) (PSB-block-4AS), poly(acenapthylene-block-maleic acid) (PAN-block-MA), poly(acenapthylene-block-acrylic acid) (PAN-block-AA), poly(acenapthylene-block-allylamine) (PAN-block-ALA), poly(acenapthylene-block-4-aminostyrene) (PAN-block-4AS), poly(isobutylene-block-maleic acid) (PIB-block-MA), poly(isobutylene-block-acrylic acid) (PIB-block-AA), poly(isobutylene-block-methacrylic acid) (PIB-block-MAA), poly(isobutylene-block-4-hydroxystryrene) (PIB-block-4HS), poly(isobutylene-block-4-vinylpyridine) (PIB-block-4VP), poly(isobutylene-block-allylamine) (PIB-block-ALA), poly(isobutylene-block-4-aminostyrene (PIB-block-4AS), poly(1-octadecene-block-maleic acid) (POD-block-MA), poly(1-octadecene-block-acrylic acid) (POD-block-AA), poly(1-octadecene-block-methacrylic acid) (POD-block-MAA), poly(1-octadecene-block-4-hydroxystryrene) (POD-block-4HS), poly(1-octadecene-block-4-vinylpyridine) (POD-block-4VP), poly(1-octadecene-block-allylamine) (POD-block-ALA), poly(1-octadecene-block-4-aminostyrene (POD-block-4AS), poly(1-tetradecene-block-maleic acid) (PTD-block-MA), poly(1-tetradecene-block-acrylic acid) (PTD-block-AA), poly(1-tetradecene-block-methacrylic acid) (PTD-block-MAA), poly(1-tetradecene-block-4-hydroxystryrene) (PTD-block-4HS), poly(1-tetradecene-block-4-vinylpyridine) (PTD-block-4VP), poly(1-tetradecene-block-allylamine) (PTD-block-ALA), poly(1-tetradecene-block-4-aminostyrene (PTD-block-4AS), poly(1-dodecene-block-maleic acid) (PDD-block-MA), poly(1-dodecene-block-acrylic acid) (PDD-block-AA), poly(1-dodecene-block-methacrylic acid) (PDD-block-MAA), poly(1-dodecene-block-4-hydroxystryrene) (PDD-block-4HS), poly(1-dodecene-block-4-vinylpyridine) (PDD-block-4VP), poly(1-dodecene-block-allylamine) (PDD-block-ALA), poly(1-dodecene-block-4-aminostyrene (PDD-block-4AS), poly(1-decene-block-maleic acid) (PD-block-MA), poly(1-decene-block-acrylic acid) (PD-block-AA), poly(1-decene-block-methacrylic acid) (PD-block-MAA), poly(1-decene-block-4-hydroxystryrene) (PD-block-4HS), poly(1-decene-block-4-vinylpyridine) (PD-block-4VP), poly(1-decene-block-allylamine) (PD-block-ALA), poly(1-decene-block-4-aminostyrene (PD-block-4AS), poly(1-octene-block-maleic acid) (PO-block-MA), poly(1-octene-block-acrylic acid) (PO-block-AA), poly(1-octene-block-methacrylic acid) (PO-block-MAA), poly(1-octene-block-4-hydroxystryrene) (PO-block-4HS), poly(1-octene-block-4-vinylpyridine) (PO-block-4VP), poly(1-octene-block-allylamine) (PO-block-ALA), poly(1-octene-block-4-aminostyrene (PO-block-4AS), poly(1-hexene-block-maleic acid) (PH-block-MA), poly(1-hexene-block-acrylic acid) (PH-block-AA), poly(1-hexene-block-methacrylic acid) (PH-block-MAA), poly(1-hexene-block-4-hydroxystryrene) (PH-block-4HS), poly(1-hexene-block-4-vinylpyridine) (PH-block-4VP), poly(1-hexene-block-allylamine) (PH-block-ALA), poly(1-hexene-block-4-aminostyrene (PH-block-4AS), poly(propylene-block-maleic acid) (PP-block-MA), poly(propylene-block-acrylic acid) (PP-block-AA), poly(propylene-block-methacrylic acid) (PP-block-MAA), poly(propylene-block-4-hydroxystryrene) (PP-block-4HS), poly(propylene-block-4-vinylpyridine) (PP-block-4VP), poly(propylene-block-allylamine) (PP-block-ALA), poly(propylene-block-4-aminostyrene (PP-block-4AS), poly(ethylene-block-maleic acid) (PE-block-MA), poly(ethylene-block-acrylic acid) (PE-block-AA), poly(ethylene-block-methacrylic acid) (PE-block-MAA), poly(ethylene-block-4-hydroxystryrene) (PE-block-4HS), poly(ethylene-block-4-vinylpyridine) (PE-block-4VP), poly(ethylene-block-allylamine) (PE-block-ALA), poly(ethylene-block-4-aminostyrene (PE-block-4AS), poly(tetrafluoroethylene-block-maleic acid) (PTFE-block-MA), poly(tetrafluoroethylene-block-acrylic acid) (PTFE-block-AA), poly(tetrafluoroethylene-block-methacrylic acid) (PTFE-block-MAA), poly(tetrafluoroethylene-block-4-hydroxystryrene) (PTFE-block-4HS), poly(tetrafluoroethylene-block-4-vinylpyridine) (PTFE-block-4VP), poly(tetrafluoroethylene-block-allylamine) (PTFE-block-ALA), poly(tetrafluoroethylene-block-4-aminostyrene (PTFE-block-4AS), poly(difluoroethylene-block-maleic acid) (PDFE-block-MA), poly(difluoroethylene-block-acrylic acid) (PDFE-block-AA), poly(difluoroethylene-block-methacrylic acid) (PDFE-block-MAA), poly(difluoroethylene-block-4-hydroxystryrene) (PDFE-block-4HS), poly(difluoroethylene-block-4-vinylpyridine) (PDFE-block-4VP), poly(difluoroethylene-block-allylamine) (PDFE-block-ALA), poly(difluoroethylene-block-4-aminostyrene (PDFE-block-4AS), poly(butadiene-block-maleic acid) (PBD-block-MA), poly(butadiene-block-acrylic acid) (PBD-block-AA), poly(butadiene-block-methacrylic acid) (PBD-block-MAA), poly(butadiene-block-4-hydroxystryrene) (PBD-block-4HS), poly(butadiene-block-4-vinylpyridine) (PBD-block-4VP), poly(butadiene-block-allylamine) (PBD-block-ALA), poly(butadiene-block-4-aminostyrene (PBD-block-4AS).

Particularly preferred copolymers are alternating copolymers such as poly(styrene-alt-maleic acid) (PSaMA), poly(styrene-alt-maleic acid) (PS-alt-MA), poly(styrene-alt-acrylic acid) (PS-alt-AA), poly(styrene-alt-methacrylic acid) (PS-alt-MAA), poly(styrene-alt-4-hydroxystryrene) (PS-alt-4HS), poly(styrene-alt-4-vinylpyridine) (PS-alt-4VP), poly(styrene-alt-allylamine) (PS-alt-ALA), poly(styrene-alt-4-aminostyrene) (PS-alt-4AS), poly(stilbene-alt-maleic acid) (PSB-alt-MA), poly(stilbene-alt-acrylic acid) (PSB-alt-AA), poly(stilbene-alt-4-vinylpyridine) (PSB-alt-4VP), poly(stilbene-alt-allylamine) (PSB-alt-ALA), poly(stilbene-alt-4-aminostyrene) (PSB-alt-4AS), poly(acenapthylene-alt-maleic acid) (PAN-alt-MA), poly(acenapthylene-alt-acrylic acid) (PAN-alt-AA), poly(acenapthylene-alt-allylamine) (PAN-alt-ALA), poly(acenapthylene-alt-4-aminostyrene) (PAN-alt-4AS), poly(isobutylene-alt-maleic acid) (PIB-alt-MA), poly(isobutylene-alt-acrylic acid) (PIB-alt-AA), poly(isobutylene-alt-methacrylic acid) (PIB-alt-MAA), poly(isobutylene-alt-4-hydroxystryrene) (PIB-alt-4HS), poly(isobutylene-alt-4-vinylpyridine) (PIB-alt-4VP), poly(isobutylene-alt-allylamine) (PIB-alt-ALA), poly(isobutylene-alt-4-aminostyrene (PIB-alt-4AS), poly(1-octadecene-alt-maleic acid) (POD-alt-MA), poly(1-octadecene-alt-acrylic acid) (POD-alt-AA), poly(1-octadecene-alt-methacrylic acid) (POD-alt-MAA), poly(1-octadecene-alt-4-hydroxystryrene) (POD-alt-4HS), poly(1-octadecene-alt-4-vinylpyridine) (POD-alt-4VP), poly(1-octadecene-alt-allylamine) (POD-alt-ALA), poly(1-octadecene-alt-4-aminostyrene (POD-alt-4AS), poly(1-tetradecene-alt-maleic acid) (PTD-alt-MA), poly(1-tetradecene-alt-acrylic acid) (PTD-alt-AA), poly(1-tetradecene-alt-methacrylic acid) (PTD-alt-MAA), poly(1-tetradecene-alt-4-hydroxystryrene) (PTD-alt-4HS), poly(1-tetradecene-alt-4-vinylpyridine) (PTD-alt-4VP), poly(1-tetradecene-alt-allylamine) (PTD-alt-ALA), poly(1-tetradecene-alt-4-aminostyrene (PTD-alt-4AS), poly(1-dodecene-alt-maleic acid) (PDD-alt-MA), poly(1-dodecene-alt-acrylic acid) (PDD-alt-AA), poly(1-dodecene-alt-methacrylic acid) (PDD-alt-MAA), poly(1-dodecene-alt-4-hydroxystryrene) (PDD-alt-4HS), poly(1-dodecene-alt-4-vinylpyridine) (PDD-alt-4VP), poly(1-dodecene-alt-allylamine) (PDD-alt-ALA), poly(1-dodecene-alt-4-aminostyrene (PDD-alt-4AS), poly(1-decene-alt-maleic acid) (PD-alt-MA), poly(1-decene-alt-acrylic acid) (PD-alt-AA), poly(1-decene-alt-methacrylic acid) (PD-alt-MAA), poly(1-decene-alt-4-hydroxystryrene) (PD-alt-4HS), poly(1-decene-alt-4-vinylpyridine) (PD-alt-4VP), poly(1-decene-alt-allylamine) (PD-alt-ALA), poly(1-decene-alt-4-aminostyrene (PD-alt-4AS), poly(1-octene-alt-maleic acid) (PO-alt-MA), poly(1-octene-alt-acrylic acid) (PO-alt-AA), poly(1-octene-alt-methacrylic acid) (PO-alt-MAA), poly(1-octene-alt-4-hydroxystryrene) (PO-alt-4HS), poly(1-octene-alt-4-vinylpyridine) (PO-alt-4VP), poly(1-octene-alt-allylamine) (PO-alt-ALA), poly(1-octene-alt-4-aminostyrene (PO-alt-4AS), poly(1-hexene-alt-maleic acid) (PH-alt-MA), poly(1-hexene-alt-acrylic acid) (PH-alt-AA), poly(1-hexene-alt-methacrylic acid) (PH-alt-MAA), poly(1-hexene-alt-4-hydroxystryrene) (PH-alt-4HS), poly(1-hexene-alt-4-vinylpyridine) (PH-alt-4VP), poly(1-hexene-alt-allylamine) (PH-alt-ALA), poly(1-hexene-alt-4-aminostyrene (PH-alt-4AS), poly(propylene-alt-maleic acid) (PP-alt-MA), poly(propylene-alt-acrylic acid) (PP-alt-AA), poly(propylene-alt-methacrylic acid) (PP-alt-MAA), poly(propylene-alt-4-hydroxystryrene) (PP-alt-4HS), poly(propylene-alt-4-vinylpyridine) (PP-alt-4VP), poly(propylene-alt-allylamine) (PP-alt-ALA), poly(propylene-alt-4-aminostyrene (PP-alt-4AS), poly(ethylene-alt-maleic acid) (PE-alt-MA), poly(ethylene-alt-acrylic acid) (PE-alt-AA), poly(ethylene-alt-methacrylic acid) (PE-alt-MAA), poly(ethylene-alt-4-hydroxystryrene) (PE-alt-4HS), poly(ethylene-alt-4-vinylpyridine) (PE-alt-4VP), poly(ethylene-alt-allylamine) (PE-alt-ALA), poly(ethylene-alt-4-aminostyrene (PE-alt-4AS), poly(tetrafluoroethylene-alt-maleic acid) (PTFE-alt-MA), poly(tetrafluoroethylene-alt-acrylic acid) (PTFE-alt-AA), poly(tetrafluoroethylene-alt-methacrylic acid) (PTFE-alt-MAA), poly(tetrafluoroethylene-alt-4-hydroxystryrene) (PTFE-alt-4HS), poly(tetrafluoroethylene-alt-4-vinylpyridine) (PTFE-alt-4VP), poly(tetrafluoroethylene-alt-allylamine) (PTFE-alt-ALA), poly(tetrafluoroethylene-alt-4-aminostyrene (PTFE-alt-4AS), poly(difluoroethylene-alt-maleic acid) (PDFE-alt-MA), poly(difluoroethylene-alt-acrylic acid) (PDFE-alt-AA), poly(difluoroethylene-alt-methacrylic acid) (PDFE-alt-MAA), poly(difluoroethylene-alt-4-hydroxystryrene) (PDFE-alt-4HS), poly(difluoroethylene-alt-4-vinylpyridine) (PDFE-alt-4VP), poly(d ifluoroethylene-alt-allylamine) (PDFE-alt-ALA), poly(difluoroethylene-alt-4-aminostyrene (PDFE-alt-4AS), poly(butadiene-alt-maleic acid) (PBD-alt-MA), poly(butadiene-alt-acrylic acid) (PBD-alt-AA), poly(butadiene-alt-methacrylic acid) (PBD-alt-MAA), poly(butadiene-alt-4-hydroxystryrene) (PBD-alt-4HS), poly(butadiene-alt-4-vinylpyridine) (PBD-alt-4VP), poly(butadiene-alt-allylamine) (PBD-alt-ALA), poly(butadiene-alt-4-aminostyrene (PBD-alt-4AS).

It has been found that copolymers produce stronger membranes compared to membranes produced from homopolymers. Having membranes with high strength is considered beneficial during membrane production as well as during their use. During production stronger membranes are easier to handle as they can withstand more stress without taking damage. This allows for instance for faster production and/or less specialized equipment. This benefit applies to uncrosslinked membranes and to crosslinked membranes. For some applications, also during their use strong membranes are preferred as they tend to stay intact for longer without failing. A specific benefit can be the use of higher pressures over the membrane resulting in an increase flux over said membrane. Without being bound by theory, it is thought that this is due to the increased hydrophobicity present in the copolymers which limits the amount of water in the membrane resulting in a denser membrane that can be crosslinked more efficiently compared to for instance membranes made from homopolymers. It has been found that alternating copolymers produce membranes that are even stronger than copolymers. Hence in the method of the invention it is preferred to use alternating copolymers.

In a preferred embodiment the aqueous solution comprising a responsive copolymer, and optionally a charged polymer, comprises a responsive copolymer that can be in a charged or an uncharged state depending on the solution properties as well as an oppositely charged polymer such as a homopolymer or a copolymer. It is understood that oppositely charged implies that if the responsive copolymer in its charged state is positive, the charged polymer is negative and if the responsive copolymer in its charged state is negative, the charged polymer is positive. The solvent properties of the aqueous solution may be chosen such that the responsive polymer is uncharged. Upon contacting the aqueous solution with an aqueous coagulation bath, a change in pH due to solvent exchange will cause the responsive polymer to charge-up resulting in the formation of a complex comprising the charged responsive copolymer and the oppositely charged polymer. The complex formed is an insoluble porous membrane. Membranes produced in said manner are denoted as complex membranes.

In a preferred embodiment the aqueous solution comprising a responsive copolymer, and optionally a charged polymer, comprises a responsive copolymer that is in a charged state as well as an oppositely charged polymer, such as a homopolymer or a copolymer. The solvent properties of the aqueous solution are chosen such that the salt concentration is so high that complexation does not take place in the aqueous solution. Upon contacting the aqueous solution with an aqueous coagulation bath, a change salt concentration due to solvent exchange will lead to the formation of a complex comprising the charged responsive copolymer and the oppositely charged polymer. The complex formed is an insoluble porous membrane. Membranes produced in said manner are denoted as complex membranes.

In a further preferred embodiment the oppositely charged polymer is a non-responsive oppositely charged polymer.

The method according to the invention produces porous films such as membranes without the need for organic solvents. A porous film is a film that has pores. In the context of this invention a pore is a small opening in the material constituting the film. A pore can be open to both faces of a film, spanning the thickness of the film and forming a transecting void space. A pore can also be open to only a single side of the film, thus forming a cavity that does not transect the film. The section of a pore can be round, substantially round, elliptical, substantially elliptical, or irregularly shaped. Pores can have an average diameter of at least 0.1, 0.2, 0.3, 0.4, 0.5, 0.6, 0.7, 0.8, 0.9, 1, 1.1, 1.2, 1.3, 1.4, 1.5, 2, 3, 4, 5, 10, 15, 20, 25, 30, 35, 40, 45, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 420, 440, 460, 480, 500, 520, 540, 560, 580, 600, 620, 640, 660, 680, 700, 720, 740, 760, 780, 800, 820, 840, 860, 880, 900, 920, 940, 960, 980, or 1000 nm or more. Preferably, pores have an average diameter of at most 20, 25, 30, 35, 40, 45, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 420, 440, 460, 480, 500, 520, 540, 560, 580, 600, 620, 640, 660, 680, 700, 720, 740, 760, 780, 800, 820, 840, 860, 880, 900, 920, 940, 960, 980, or 1000 nm, or of 2, 3, 4, 5, 6, 7, 8, 9, 10, 11, 12, 13, 14, 15, 20, 30, 40, 50, 60, 70, 80, 90, 100 µm or more. The average diameter of a pore is preferably measured over its largest internal diameter.

In the context of this invention, a film is a polymer layer, optionally comprising further materials. The layer preferably has a minimum thickness of 1, 2, 3, 4, 5, 10, 15, 20, 25, 30, 35, 40, 45, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 420, 440, 460, 480, 500, 520, 540, 560, 580, 600, 620, 640, 660, 680, 700, 720, 740, 760, 780, 800, 820, 840, 860, 880, 900, 920, 940, 960, 980, 1000, 1100, 1200, 1300, 1400, or 1500 µm or more. The layer preferably has a maximum thickness of 300, 310, 320, 330, 340, 350, 360, 370, 380, 390, 400, 420, 440, 460, 480, 500, 520, 540, 560, 580, 600, 620, 640, 660, 680, 700, 720, 740, 760, 780, 800, 820, 840, 860, 880, 900, 920, 940, 960, 980, or 1000 µm or of 2, 3, 4, 5, 6, 7, 8, 9, 10 mm, or of 1.5, 2, 2.5, 3, 3.5, 4, 4.5, or 5 cm or more. Preferably the layer has a thickness of 10-1000 µm, more preferably of 20-500 µm, 50-500 µm, 50-400 µm, or of 100-300 µm.

In the context of this invention, a film can be a predominantly or entirely flat or curved sheet or disc or other continuous surface. A film can also have two distinct surface faces, such as an interior and an exterior face, for example for a hollow fibre, a hollow corrugated fibre, a hollow tube, a hollow corrugated tube, or other shapes enclosing a volume. The porous films according to the invention can be further processed after performing the method according to the invention to obtain particular shapes. This further processing can be done via cutting, stamping, or any method known in the art.

The method according to the invention relies on aqueous phase separation (APS), which is the occurrence of phase separation in a multicomponent aqueous mixture induced by a change in solvent quality, such as its pH, its temperature, or the concentration of a solute, such as its salt concentration or ionic strength. An important underlying principle is that water can act as both a good solvent and as (very) poor solvent for certain responsive monomers and for certain responsive copolymers, surprisingly allowing an entirely aqueous phase separation process. FIG. 1 schematically illustrates the APS process. In the context of this invention, phase separation is the transition of at least part of the dissolved responsive copolymer to an eventual solid or gel state, the solid or gel polymer forming the porous film. Preferably the film according to the invention is solid.

For responsive copolymers a transition from soluble to insoluble is surprisingly possible in a completely aqueous environment, for example by a change in the solvent quality, wherein the change in solvent quality is induced by one or more selected from the group consisting of pH, temperature (T), and/or solute concentration ($C_{sol}$) such as salt concentration ($C_{salt}$) or acid concentration ($C_{acid}$). This allows one to follow the long established procedures used for NIPS, but under completely or at least substantially aqueous conditions. APS retains the key strengths of the NIPS approach, allows control over film structure, without requiring any organic solvents. This makes the approach an appealing and sustainable alternative to traditional film production.

Method for Creating a Porous Film

In i) of the method according to the invention an aqueous solution comprising a dissolved responsive copolymer is provided. The provision of such an aqueous solution can be via any method known in the art. A suitable copolymer can be separately provided and dissolved in a suitable aqueous solution, a suitable copolymer can be polymerized from its constituent monomers in a suitable aqueous solution, or an aqueous solution comprising a dissolved responsive copolymer can be procured from a commercial source.

The aqueous solution comprises a dissolved responsive copolymer. In the context of this invention a responsive copolymer is a polymer that responds to a change in solvent quality resulting in a change in its solubility, preferably decreasing it. Preferably, the change in solvent quality is the result of a change in pH, temperature or ionic strength.

In preferred embodiments, the aqueous polymer solution comprises 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 60, 70, 80, 90 or more percent by weight of the responsive copolymer. More preferably, about 10-40 percent by weight is comprised.

In ii) of the method according to the invention, the aqueous solution comprising a responsive copolymer is formed into a thin layer which is contacted with an aqueous coagulation solution in which the responsive copolymer is not soluble or in which the a complex comprising the responsive copolymer and the charged polymer is not soluble. In the context of this invention, the responsive copolymer is considered not to be soluble if its solubility in the aqueous coagulation solution is at least 1, 5, 10, 15, 20, 25, 30, 35, 40, 45, 50, 55, 60, 65, 70, 75, 80, 85, 90, 95, or 100 percent lower when expressed using the same mass per volume solubility ratio. In a similar fashion a complex comprising the responsive copolymer and the charged polymer is considered not to be soluble if its solubility in the aqueous coagulation solution is at least 1, 5, 10, 15, 20, 25, 30, 35, 40, 45, 50, 55, 60, 65, 70, 75, 80, 85, 90, 95, or 100 percent lower when expressed using the same mass per volume solubility ratio. Solubility can for example be determined by preparing a saturated solution of a known volume in a given solvent, and then evaporating or lyophilising the solvent, after which the residual solids are weighed.

The aqueous coagulation solution induces a phase transition of the dissolved responsive copolymer, for example coagulating it. The nature of the aqueous coagulation solution depends on the aqueous copolymer solution and the responsive copolymer. The aqueous coagulation solution can be a solution that besides not having a dissolved responsive copolymer is identical to that of the aqueous copolymer solution, but differing in only a single further parameter. For example, the aqueous coagulation solution can be warmer or colder, the aqueous coagulation solution can be more acidic or more basic (i.e. having a lower pH or a higher pH), or aqueous coagulation solution can have a higher or a lower concentration of a particular solute such as a salt.

Generally it will be convenient if the aqueous copolymer solution is a bath, in the sense of a volume whose parameters do not substantially change when exposed to, and eventually equilibrated with, a smaller volume such as the volume of the aqueous polymer solution. Preferably the volume of a bath is at least 2, 5, 10, 20, 30, 40, 50, 100, 150, 200, 250, 500, 750, 1000, 2000, 5000 or 10000 times as large as the volume of the aqueous polymer solution. As such, contacting an aqueous copolymer solution with an aqueous coagulation solution substantially changes the parameters of the aqueous copolymer solution to those of the aqueous coagulation solution causing the copolymer to respond and undergo a phase transition. Based on these parameters, a suitable aqueous coagulation solution can be selected.

The aqueous copolymer solution is contacted with the aqueous coagulation solution. This contacting can be as simple as submerging the aqueous copolymer solution in a bath or volume of the aqueous coagulation solution. This is particularly suitable for forming porous films in the shape of a sheet or surface. Alternatively, the aqueous copolymer solution can be injected into the aqueous coagulation solution. This is particularly suitable for forming porous films in the shape of a hollow fibre, reed, or tube, or corrugated versions thereof.

In preferred embodiments, ii) of the method can be further detailed as: iia) applying the aqueous solution comprising a responsive copolymer on a surface to create a coated surface wherein the surface is coated with the aqueous solution comprising a responsive copolymer; and iib) immersing the coated surface in a coagulation bath comprising an aqueous coagulation solution in which the responsive copolymer, or complex comprising the responsive copolymer, is not soluble. Preferably, this surface is selected from the group consisting of a glass surface, a plastic surface such as a polytetrafluoroethylene (PTFE) surface or a polypropylene surface, a ceramic surface, a metal surface, a porous surface such as a non-woven surface, and surfaces that are preformed membranes of membrane materials known in the art such as PES, PSU, polyvinylidene difluoride (PVDF), poly(vinyl chloride) (PVC), polyether ether ketone (PEEK), cellulose, and ceramics. Preferably, the coated surface comprises a support layer. Preferably, the aqueous solution comprising a responsive copolymer is applied by casting, dropcasting, spincoating, dipcoating, printing, stamping, spraying, or pouring.

In iia) the aqueous solution comprising a responsive copolymer is applied on a surface to create a coated surface. The coated surface is thus a surface—sometimes referred to as a substrate—that is coated with said aqueous solution, forming an aqueous copolymer solution coating. The creation of coated surfaces is known in the art, as are surfaces that are suitable to be coated. Examples of suitable surfaces are surfaces made of glass, quartz glass, ceramics, plastics such as high density polyethylene, polypropylene, PTFE, or polystyrene, metals and alloys such as titanium, steel, or aluminium, surfaces that are preformed membranes of membrane materials known in the art such as PES, PSU, polyvinylidene difluoride (PVDF), poly(vinyl chloride) (PVC), polyether ether ketone (PEEK), cellulose, and ceramics, and porous surfaces such as non-woven surfaces, for example non-woven rayon, polyethylene terephthalate (PET), polypropylene, cotton, polyester, PVDF, PVC, or fibreglass. A glass surface is very suitable. A porous surface is suitable if it is desired that the porous film is later not separated from the surface, for example when it is desired for the surface to impart mechanical strength to the porous film.

Similarly, techniques for applying a coating are well known, and any such known technique can be used for making a coated surface wherein the surface is coated with the aqueous solution comprising a responsive copolymer. Examples of suitable coating techniques are casting such as casting, drop casting, pouring, printing, stamping, spraying, spin coating, and dip coating.

In iia) the aqueous solution comprising a responsive copolymer forms a coating on the surface. Preferably, the shape of the coating determines the shape of the porous film that is formed. The coating preferably has a minimum thickness of 1, 2, 3, 4, 5, 10, 15, 20, 25, 30, 35, 40, 45, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 420, 440, 460, 480, 500, 520, 540, 560, 580, 600, 620, 640, 660, 680, 700, 720, 740, 760, 780, 800, 820, 840, 860, 880, 900, 920, 940, 960, 980, 1000, 1100, 1200, 1300, 1400, or 1500 µm or more. The coating preferably has a maximum thickness of 300, 310, 320, 330, 340, 350, 360, 370, 380, 390, 400, 420, 440, 460, 480, 500, 520, 540, 560, 580, 600, 620, 640, 660, 680, 700, 720, 740, 760, 780, 800, 820, 840, 860, 880, 900, 920, 940, 960, 980, or 1000 µm or of 2, 3, 4, 5, 6, 7, 8, 9, 10 mm, or of 1.5, 2, 2.5, 3, 3.5, 4, 4.5, or 5 cm or more. Preferably the coating has a thickness of 10-1000 µm, more preferably of 20-500 µm, 50-500 µm, 50-400 µm, or of 100-300 µm.

In iib) the coated surface is immersed in a coagulation bath comprising an aqueous coagulation solution in which the responsive copolymer, or complex comprising the responsive copolymer, is not soluble. A coagulation bath is a volume of aqueous coagulation solution as described earlier herein. This immersion can be in any way, for example by dipping the coated surface in a volume of coagulation solution, or by filling a volume with coagulation solution, wherein the coated surface was already present in the volume.

In alternative preferred embodiments, ii) of the method can be further detailed as: iia) forming a tube of the aqueous solution comprising a responsive copolymer, and optionally a charged polymer, wherein at least one of the monomers in the responsive copolymer is a responsive monomer and wherein the tube is filled with a further aqueous solution; and iib) immersing the tube of the aqueous solution comprising a responsive copolymer, and optionally a charged polymer, in an aqueous bath wherein the aqueous bath and/or the further aqueous solution in the tube comprises the aqueous coagulation solution in which the responsive copolymer or complex comprising the responsive copolymer and the charged polymer is not soluble. It is understood that a tube corresponds to a thin layer that has been rolled-up.

It is understood that after coagulation a porous tube formed by the method of the invention corresponds to a porous hollow fibre or a porous hollow fibre membrane.

A particularly suitable manner to form a tube of the aqueous solution is to inject the aqueous copolymer solution in the coagulation bath using a spinneret. For instance a circular spinneret can be used for the creation of hollow fibres with smooth or substantially smooth surfaces, and with a substantially circular cross section. Alternately a modified spinneret can be used, which has a non-circular cross section, resulting in hollow fibres with a matching shape. Alternatively a modified spinneret can be used, which has defined structures at its outlet. Such defined structures can create a defined structure at the outside of the created hollow fibre, at the inside of the created hollow fibre, or at both the inside and the outside of the hollow fibre. As a non-limiting example, such a modified spinneret can have protrusions on its outermost circumference pointing into of its outlet. This leads to corrugations along the length of the outer surface of a hollow fibre spun with such a spinneret. Such corrugations can improve fibre strength, whilst membrane properties remain substantially unchanged.

In iii) solvent exchange takes place between the aqueous copolymer solution and the coagulation solution, providing a change in a solution parameter invoking a response in the responsive copolymer and inducing phase transition of the responsive copolymer. This leads to the formation of a porous film as defined earlier herein. Solution parameters invoking coagulation of the responsive copolymer and the provision thereof are also defined earlier herein. The initial copolymer concentration and kinetics of the immersion are important to the eventual porous structure that is formed (Reuvers et al., J. membrane Sci. 1987, 34, 45). When coagulation is very fast, the responsive copolymers in the aqueous polymer solution coating have only little time to undergo phase transition, and a structure with small surface pores is formed. Very quick phase transition at high copolymer concentrations can even lead to the formation of a dense skin layer. Conversely, when the aqueous copolymer solution coating is given more time to undergo phase transition, the pores have more time to grow bigger, halting their growth when solidification sets in.

Just as in traditional NIPS, the kinetics of solvent exchange can be controlled to create films with different structures. Examples of parameters that are of influence on resulting film structure are the concentration of responsive copolymer in the aqueous polymer solution, the temperature of the coated surface, the temperature at which solvent is exchanged, the pH of the aqueous copolymer solution, and the pH of the aqueous coagulation solution. $H_3O^+$ and $OH^-$ have extremely high diffusion speeds due to their small size, and have the possibility to be conducted through a hydrogen bond network. This means that pH-responsive polymers allow a wide variety of coagulation kinetics and thus allow a wide variety of membrane structures to be formed. Accordingly pH is a preferred parameter to influence the solvent quality for responsive copolymers. A person skilled in NIPS will be able to adapt traditional NIPS process parameters to the method according to the invention.

In allowing solvent exchange between the aqueous copolymer solution and the coagulation solution, the solvent quality is changed for the responsive copolymer, inducing phase separation. As described above, the kinetics of this solvent exchange can influence the architecture of the resulting porous film. In preferred embodiments, the porous film that is created is an asymmetric porous film. The asymmetry in this context is along the thickness of the film, because the initial contact surface of the aqueous copolymer solution coating can have a more immediate solvent exchange with the coagulation solution, leading to more rapid phase separation. For example, the initially coagulated top part of the film can reduce the tempo with which deeper regions of the coating undergo solvent exchange, leading to slower phase separation and thus to larger cavities and therefore to larger pores. These concepts are known from conventional NIPS, and a skilled person will know how to determine suitable solvent exchange parameters to obtain particular architectures.

Preferably, the present method comprises the additional action or feature of: selecting a suitable concentration for the responsive copolymer, or selecting a suitable temperature for ii), or selecting a suitable temperature for iii), or selecting a suitable coagulation solution. Optionally, the method comprises the additional actions of: selecting a suitable surface for iia), or selecting a suitable support layer.

Preferably, i), ii), and iii) of the method according to the invention are performed sequentially in that order. Preferably, i), iia), iib), and iii) of the method according to the invention are performed sequentially in that order.

Optionally, the method according to the invention comprises additional action iv), which entails removing the porous film from the surface that was originally coated with the aqueous copolymer solution coating. In removing the porous film from the surface it becomes a free standing porous film. In preferred embodiments, the surface may have comprised a support layer; in such cases the porous film is only removed from the surface together with the support layer, forming a single multi-layered material. Removing a film from a surface can be done via any method known in the art such as peeling, lifting, rolling, and soaking with a suitable liquid. Examples of suitable liquids are water or alcohols such as $C_1$-$C_4$ alkanols such as ethanol.

A support layer can provide additional characteristics to a porous film according to the invention. For example it can provide mechanical strength by using a support layer with good mechanical properties, ease of handling by using a support layer with known features, ease of identification through colour use or by using a support layer with pre-printed text or imagery, and protection by using a support layer that is intended to be removed prior to use of the porous film. Examples of support layers are known protective films such as HDPE, or known porous materials with good mechanical strength such as non-woven materials. Preferably the porosity of the non-woven is of such an extent that it does not influence the effect of the porosity of the porous film; for example, it is preferred that the non-woven has pores that are significantly larger than pores of the porous film, so that the filtration properties of the resulting membrane remain similar despite the presence of the nonwoven support.

Crosslinking

Many porous films as formed by APS, such as polyelectrolyte complexes, are chemically stable and robust. For porous films with a relatively low stability crosslinking can be used to add mechanical strength and stability. In the context of this invention crosslinking is the creation of a bond between side chains of different polymers, to form connections between different chains. Crosslinking as such is known in the art.

Accordingly, in preferred embodiments, the method further comprises a crosslinking operation crosslinking the porous film. Preferably, this crosslinking is performed using a crosslinker, which can for instance be a polymeric crosslinker or a monomeric crosslinker. A polymeric crosslinker is typically added to the aqueous copolymer solution. Using the method of the invention a membrane with a homogeneous distribution of crosslinker over its volume can be produced resulting in an evenly crosslinked membrane. Small monomeric crosslinkers can also be added to a solution comprising a membrane produced according to the method of the invention. The small molecules will diffuse into the membrane resulting in a crosslinked membrane. Examples of suitable crosslinkers include dihaloalkanes such as 1,4-dichlorobutane or 1,6-dibromohexane, diamines such as ethane-1,2-diamine, propane-1,3-diamine, putrescine, cadaverine, hexane-1,6-diamine, polyamines such as PAH or PEI, di-alcohols, polyalcohols such as poly vinyl alcohol, di- or tri-epoxy's, aldehydes such as formaldehyde and dialdehydes, via heating of the porous film, or via radiation such as an ion beam.

Crosslinking via a reactive molecule, referred to as a crosslinking agent, is attractive because the choice of agent allows for control over the crosslinking process. A crosslinking agent has more than one reactive group and can have two, three, four, or more different reactive groups. Such agents are known in the art. Examples of suitable crosslinking agents are dihaloalkanes, diamines, dicarboxylic acids, diacrylates, aldehydes such as formaldehyde and dialdehydes, and other molecules featuring two or more Michael acceptors. Crosslinking agents can have more than one different reactive moiety, such as an agent comprising an amine and an acryl ester, or comprising an aldehyde and a carboxylic acid. Alkanes are suitable scaffold moieties for crosslinking agents due to their plain structure and predictable structure-activity relationship, but other scaffold moieties such as aryl, heteroaryl, cyclyl, heterocyclyl, and peptide moieties can be used.

Dihaloalkanes are crosslinking agents that are suitable for reacting with nucleophilic groups, and that can be used for reducing the overall positive charge of a film. Preferred halogens are chlorine and bromine. Examples of preferred dihaloalkanes are 1,3-dichloropropane, 1,4-dichlorobutane, 1,5-dichloropentane, 1,6-dichlorohexane, 1,3-dibromopropane, 1,4-dibromobutane, 1,5-dibromopentane, and 1,6-dibromohexane. Diamines are crosslinking agents that are suitable for reacting with carboxylic esters or electrophiles, and that can be used to reduce the overall negative charge of a film. Examples of preferred diamines are ethane-1,2-diamine, propane-1,3-diamine, putrescine, cadaverine, and hexane-1,6-diamine. Aldehydes and dialdehydes are crosslinking agents that are suitable for reacting with nucleophilic groups such as amines, and that can be used for reducing the overall positive charge of a film. Examples of preferred aldehydes and dialdehydes are formaldehyde, glutaraldehyde, and phthalaldehyde. Crosslinking agents as described herein can be optionally substituted with $C_1$-$C_4$ alkanes, $C_1$-$C_4$ alkenes, $C_1$-$C_4$-alkoxy, hydroxyl moieties, and other moieties.

Crosslinking by heating is preferred when the method according to the invention is for producing a neutral membrane. For example, for certain polymer combinations or with certain crosslinking agents complexed or mixed $COO^-$ and $NH_3^+$ moieties will form an amide bond at temperatures above 180° C. The simultaneous conversion of both an anionic and a cationic moiety helps ensure the overall neutral character of the resulting porous film.

Alternatively the membrane can be crosslinked using a polyamine (e.g. PAH or PEI), a di-alcohol or a polyalcohol (poly vinyl alcohol), or di- or tri-epoxy's.

In preferred embodiments applicable for complex membranes, the aqueous polymer solution comprises equal amounts of the polycationic polyelectrolyte and of the polyanionic polyelectrolyte, determined by monomeric ratio, and the crosslinking reduces the amount of anionic groups in the anionic polyelectrolye, or reduces the amount of cationic groups in the cationic polyelectrolyte. This is to create an excess of one particular type of charge in the membrane. For example, a diamine crosslinking agent can be used to connect two carboxylic acid groups. This shifts the charge balance in the membrane by only eliminating polyanionic moieties, leaving originally complexed polycationic moieties intact to contribute to the overall charged character of the formed film. Such cross-linked and highly charged membranes are very favourable for reverse osmosis applications or for solvent resistant nanofiltration (SRNF).

As the main building block of the method according to the invention is a responsive copolymer, the resulting films can retain certain responsive properties, forming responsive films such as responsive membranes. Here a trigger such as a change in pH or ionic strength can provide control over film properties, such as the separation properties of a porous membrane. Alternately, switching a film between a hydrophobic and a hydrophilic state can aid with membrane cleaning. Within the method according to the invention, the crosslink density of a crosslinked membrane will result in control over how much of the responsive behaviour of the constituent responsive copolymers remains after a porous film is formed. At high crosslink density, hardly any responsive behaviour is to be expected. At lower crosslink density more responsive behaviour remains. In preferred embodiments, the crosslinking is to such an extent that the original solution property that that induced the phase change of the responsive copolymer no longer induces such a phase change. This can be determined via routine optimisation, for example by crosslinking to a certain degree and then exposing a formed crosslinked porous film to the same aqueous solution that was used in i) of the method, after which film integrity is assessed, for example via mechanical stress tests.

Preferably the degree of crosslinking is expressed as the degree percentage of polymer side chains that have formed a link with a further side chain, forming a crosslink. In preferred embodiments, at least 0.01, 0.05, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 3, 4, 5, 6, 7, 8, 9, 10, 11, 12, 13, 14, 15, 20, 25, 30, 35, 40, 45, 50, 55, 60, 65, 70% or more of the side chains have formed crosslinks.

Properties of Porous Films

Properties of the porous films according to the invention can be assessed using known techniques, for example optical techniques such as ellipsometry and optical coherence tomography to study the swelling and stability of porous films when exposed to water, solvents, and gases. Zeta-potential and contact angle measurements, in combination with SEM, EDX, AFM, porometry and FTIR can be used to determine the the structure and properties of the new films. Mechanical properties can be determined by tensile strength measurements, while TGA will allow thermal investigations. Filtration efficiency can be determined using analysis such as UHPLC, UV spectrophotometry, and ion chromatography by determining exact concentrations of test molecules before and after membrane filtration. Membrane fouling can be mainly studied by flux decline under a fixed pressure, while subsequent back-flushing will allow one to distinguish between reversible and irreversible fouling. Optical coherence tomography allows one to visualize thicker fouling layers. For virus retention and in-activation measurements a plaque assay can be used in combination with RNA extraction, while for tests with bacteria a plate count can be used in combination with dye-assisted microscopy to inspect the membrane surface to count live and dead bacteria.

In conventional NIPS an important approach to creating advanced membranes is blending: in the context of this invention blending is the addition of a minority component, for example a further polymer, to the copolymer solution. During phase separation this additive is entrapped in the formed film, leading for example to hydrophilic, low fouling, or responsive membranes (Wandera, D.; Wickramasinghe, S. R.; Husson, S. M. J. membrane Sci., 2010, 357, 6). In NIPS, the choice of additives is severely limited due to polymer incompatibility. For polymers, just a very small amount of unfavourable interaction per monomer is enough to induce unwanted phase separation between polymer and additive (see FIG. 2a). Polymer incompatibility is thus another limitation of NIPS as it often makes blending of more advanced ingredients impossible.

An advantage of the method according to the invention is that polymer incompatibility can be circumvented, and that blending of further ingredients can be integrated in the process without leading to incomplete blending through unwanted phase separation within the film. For example, in various methods according to the invention at least one responsive copolymer is charged. Charged copolymers generally do not show phase separation due to polymer incompatibility when mixed with an additional polymeric component: for charged polymers, phase separation is unfavourable as it would bring charged chains that strongly repel each other close together. As an additional positive result of the present method, the mixing of additives with charged copolymers is generally favourable, as schematically shown in FIG. 2b. When a third component with a higher or lower charge density is added, for example an enzyme, polymer or nanoparticle, full mixing remains the most favourable option to achieve distance between charges.

Accordingly, in preferred embodiments, the aqueous copolymer solution comprises further additives, wherein the further additives are selected from the group consisting of a polypeptide, an oligonucleotide, a nanoparticle, a macromolecule, and/or a small molecule catalyst.

Polypeptides such as enzymes generally have charged surfaces, making them suitable for efficient blending in aqueous copolymer solutions for use in the invention. Their relatively large size as molecules helps ensure that an entrapped polypeptide is efficiently retained in the porous film, and does no leech out. Examples of suitable polypeptides are lipases, peroxidases, lysozymes, pore-forming membrane proteins such as ion channels and aquaporins, pepsin, and peptidases.

Oligonucleotides are DNA or RNA strands and have a polycationic backbone. As a further additive, oligonucleotides embedded in a porous film can facilitate binding of dissolved oligonucleotides with a complementary sequence, or they can serve as a binding sites for compounds that specifically recognize or interact with oligonucleotides, such as intercalating substances, DNA-binding proteins, or antibodies. Preferred oligonucleotides have a length of at most 50, 45, 40, 35, 30, 25, 20, 19, 18, 17, 16, 15, 14, 13, 12, 11, 10, 9, 8, 7, 6, or 5 monomers.

Nanoparticle as such are known in the art. In the context of this invention, they are small particles ranging in size from about 5 nanometres to about 500 nm. Nanoparticles can have anti-microbial properties, can catalyse chemical reactions at their surface, or can have desirable optical properties. Examples of nanoparticles are silver nanoparticles, titanium nanoparticles, gold nanoparticles, copper nanoparticles, zinc nanoparticles, and quantum dots. Nanoparticles can be stabilized, for example via an oxide layer, a surfactant coating, or a hydrophobic coating.

Macromolecules are large molecules, such as polypeptides, oligonucleotides, macrocycles, biopolymers, certain lipids, and certain carbohydrates. Macromolecules as such are known in the art. The incorporation of a macromolecule in a porous film according to the invention can be of use for the production of a porous film that is recognized by compounds for which the macromolecule serves as an epitope or binding site. For example, certain microbial pathogens can bind carbohydrates involved in cell glycosylation. Other macromolecules can catalyse chemical conversions by providing appropriate binding sites for reaction transition states. Further examples of macromolecules are macrocycles such as crown ethers, cyclodextrins, calixarenes, phthalocyanines, and porphyrins, all of which are optionally charged. Crown ethers such as 4-sulfonato-calix[6]arene are of interest because they can facilitate interactions with ions or other charged moieties, which can result in porous films with ion-selective filtration properties, for example to purify metal and heavy metal contaminants from water. Phthalocyanines and porphyrins can similarly host metal ions and can catalyse various reactions such as oxidations, as known in the art.

Small molecule catalyst are known in the art and are often of interest in chiral conversions. For use as a further additive, small molecules per se can be expected to rapidly leech out of the films according to the invention. Accordingly, it is preferred that small molecule catalysts have a reactive moiety as described for cross linking agents. This allows their covalent incorporation in porous films according to the invention, preventing their leeching. The immobilization of catalysts on surfaces or supports is known in the art.

Preferably, the porous film that is created is a catalytic film, wherein the further additive is an enzyme, a small molecule catalyst, a macromolecule, or a nanoparticle.

Preferably, the porous film that is created is an ion binding or ion transporting film, wherein the further additive is a crown ether, preferably a charged crown ether such as 4-sulfonato-calix[6]arene. In this context the further additive can also be a polypeptide known to bind or transport ions, such as a pore forming ion channel membrane protein, haemoglobin, ferritin, lactoferrin, or transferrin.

In preferred embodiments, the porous film that is created is an anti-viral film or anti-microbial film. For such a film the aqueous polymer solution preferably comprises further additives selected from anti-microbial nanoparticles such as silver nanoparticles and stabilized silver nanoparticles, or anti-microbial polypeptides, or anti-microbial macromolecules. Anti-microbial polypeptides or macromolecules are known in the art, examples are polymers comprising quaternary ammonia, and gramicidin. In the context of this invention, an anti-microbial effect can be an anti-viral effect.

In preferred embodiments, the porous film that is created is an antifouling film, wherein the responsive copolymer comprises a responsive monomer that also functions as a low-fouling monomer such as poly(oligoethylene glycol) acrylate (SBMA). Alternatively a low-fouling polymer can be provided with the aqueous copolymer solution in i) of the method of the invention. This will result in the incorporation of said low-fouling polymer into the porous film. Said porous film will have the low-fouling properties of the low-fouling polymer and will thus be a low-fouling porous film. Examples of low-fouling polymers include poly(oligoethylene glycol)methacrylate, such as polymers based on di-, tri-, or tetraethylene glycol acrylate or -methacrylate, for example poly(oligoethylene glycol)acrylate (pOEA), poly(oligoethylene glycol)acrylamide (pOEAAm), poly(oligoethylene glycol)methacrylate (pOEMA), poly(oligoethylene glycol)acrylamide (pOEMAAm). Further examples of low-fouling polymers include poly(ethylene glycol)s such as PEG2000, PEG3000, PEG5000, or PEG10000; and polyoxazolines such as poly(2-methyl-oxazoline), poly(2-ethyl-oxazoline), or copolymers thereof; polysulfobetaines such as quaternary polypyrrolidinium compounds, quaternary esters or amides of (meth)acrylic acid, polyvinylpyridinium, polyvinylimidazolium compounds, or ionenes, for example poly(3-dimethyl [methacryloyloxyethyl] ammonium propane sulfonate) (pDMAPS), poly(3-dimethyl [methacrylamidopropyl] ammonium propane sulfonate) (pDMAAPS), poly(styrene-[N,N'-dimethyl(maleimidopropyl)ammonium propane sulfonate]) poly(SDMMAAPS) or copolymers thereof; polycarbobetaines such as quaternary polypyrrolidinium compounds containing linear and branched alkylcarboxy groups, quaternary esters or amides of (meth)acrylic acid, in which the quaternary nitrogen is substituted by an alkoxy group of different chain length, polyzwitterions derived from polymeric heterocyclic or aromatic vinyl compounds, or copolymers thereof; and polyphosphobetaines such as poly(2-methacryloyloxyethyl phosphorylcholine) (pMPC). Such polymeric betaines are known in the art (Kudaibegenov et al., 1970, Adv. Polym. Sci. DOI: 10.1007/12_078). In the context of this invention an antifouling film does not accumulate adsorbed substances such as waste solutes that aspecifically bind the membrane. For example, in medical applications an antifouling film has low or absent interaction with serum albumins and other common solutes in bodily fluids such as blood.

Membranes Obtained by the Method of the Invention

In a second aspect, the invention relates to the porous films that are obtainable by a method of the first aspect. Preferably, these films are porous membranes or asymmetric porous membranes. They can be two-dimensional films or hollow fibres. The APS process and its associated kinetics of film formation lead to porous films with characteristics such as pore size, pore size distribution, pore location distribution, average pore shape, pore shape variation, and pore density which cannot be obtained with traditional NIPS.

Examples of particular films according to the invention have been described earlier herein, as the result of the method of their creation.

General Definitions

In this document and in its claims, the verb "to comprise" and its conjugations is used in its non-limiting sense to mean that items following the word are included, but items not specifically mentioned are not excluded. In addition, reference to an element by the indefinite article "a" or "an" does not exclude the possibility that more than one of the element is present, unless the context clearly requires that there be one and only one of the elements. The indefinite article "a" or "an" thus usually means "at least one".

The word "about" or "approximately" when used in association with a numerical value (e.g. about 10) preferably means that the value may be the given value more or less 1% of the value.

Molecules such as polymers described in this invention can be optionally substituted. Suitable optional substitutions are replacement of —H by a halogen. Preferred halogens are F, Cl, Br, and I. Further suitable optional substitutions are substitution of one or more —H by —NH$_2$, —OH, =O, alkyl, alkoxy, haloalkyl, haloalkoxy, alkene, haloalkene, alkyn, haloalkyn, and cycloalkyl. Alkyl groups have the general formula $C_nH_{2n+1}$ and may alternately be linear or branched. Unsubstituted alkyl groups may also contain a cyclic moiety, and thus have the concomitant general formula $C_nH_{2n-1}$. Optionally, the alkyl groups are substituted by one or more substituents further specified in this document. Examples of alkyl groups include methyl, ethyl, propyl, 2-propyl, t-butyl, 1-hexyl, 1-dodecyl, etc.

When a structural formula or chemical name is understood by the skilled person to have chiral centers, yet no chirality is indicated, for each chiral center individual reference is made to all three of either the racemic mixture, the pure R enantiomer, and the pure S enantiomer. When two moieties are said to together form a bond, this implies the absence of these moieties as atoms, and compliance of valence being fulfilled by a replacing electron bond. All this is known in the art.

Whenever a parameter of a substance is discussed in the context of this invention, it is assumed that unless otherwise specified, the parameter is determined, measured, or manifested under physiological conditions. Physiological conditions are known to a person skilled in the art, and comprise aqueous solvent systems, atmospheric pressure, pH-values between 6 and 8, a temperature ranging from room temperature to about 37° C. (from about 20° C. to about 40° C.), and a suitable concentration of buffer salts or other components. It is understood that charge is often associated with equilibrium. A moiety that is said to carry or bear a charge is a moiety that will be found in a state where it bears or carries such a charge more often than that it does not bear or carry such a charge. As such, an atom that is indicated in this disclosure to be charged could be non-charged under specific conditions, and a neutral moiety could be charged under specific conditions, as is understood by a person skilled in the art.

In the context of this invention, a decrease or increase of a parameter to be assessed means a change of at least 5% of the value corresponding to that parameter. More preferably, a decrease or increase of the value means a change of at least 10%, even more preferably at least 20%, at least 30%, at least 40%, at least 50%, at least 70%, at least 90%, or 100%. In this latter case, it can be the case that there is no longer a detectable value associated with the parameter.

The present invention has been described above with reference to a number of exemplary embodiments. Modifications and alternative implementations of some parts or elements are possible, and are included in the scope of protection as defined in the appended claims. All citations of literature and patent documents are hereby incorporated by reference.

EXAMPLES

Figure 1:
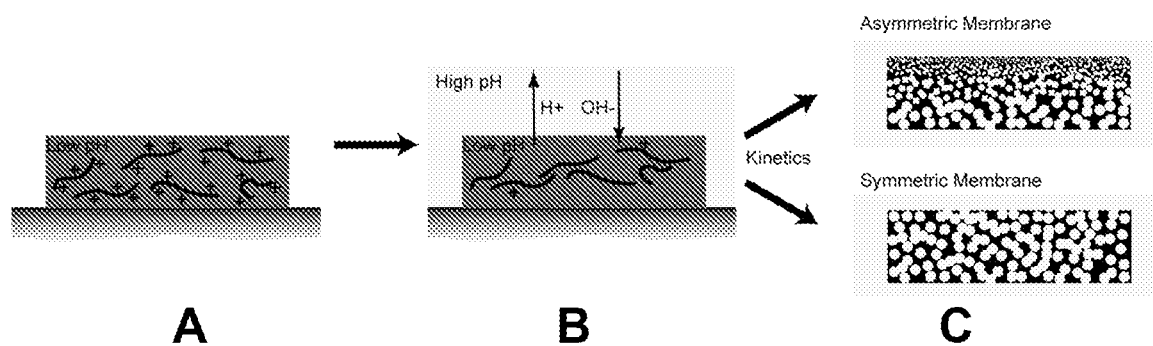
FIG. 1: Schematic illustration of the aqueous phase separation (APS) process, in this case using a pH change of the solvent to create a porous film. A) An aqueous solution comprising a responsive copolymer is applied on a surface to create a coated surface. The copolymers in the coating are in solution in the low pH of the coating. B) The coated surface, which is coated with an aqueous solution comprising a responsive copolymer, is immersed in a coagulation bath. The bath comprises an aqueous coagulation solution in which the responsive copolymer is not soluble. Equilibration of the overall pH to the value of the coagulation solution leads to phase change of the previously dissolved responsive copolymer. C) Based on the kinetics of the solvent exchange, the porous membrane can be symmetric (fast, near-simultaneous exchange throughout the entire coating) or asymmetric (fast exchange at one surface of the coating, slower exchange deeper within the coating).

Example 1: Aqueous Phase Separation to Produce Porous Films from Co-Polymers Containing 4-vinyl pyridine as the Responsive Monomer Materials Poly(4 vinyl pyridine) (P4VP, MW=200 kDa), poly(4-vinyl pyridine)-co-poly(styrene) (P4VP-PS) in a monomer ratio of 9:1, and poly(4-vinyl pyridine)-co-poly(butyl methacrylate) (P4VP-PBMA) in a monomer ratio of 9:1 were purchased from Scientific Polymer Products Inc. (Ontario, Canada) and used without further purification. Acetic acid (glacial, 100%, Merck Millipore), sodium hydroxide (97%, Merck Millipore), sodium chloride (99%, Akzo Nobel), n-hexane (96%, Merck Millipore) and 1,4 dibromobutane (99%, Sigma Aldrich) were used as received.

Membrane Preparation and Crosslinking

Either P4VP (film 1), P4VP-PS (film 2), or P4VP-PBMA (film 3) was added to a solution of water and acetic acid and stirred for several hours until dissolved; making the different membrane casting solutions. The final composition was as follows: 20 wt % polymer, 40 wt % acetic acid, and 40 wt % water. Acetic acid is generally recognized as an environmentally friendly organic solvent. For P4VP-PS we also used 20 wt % polymer and 80 wt % water (film 4), here the pH was set using HCl. The desired polymer solution was poured onto a non-woven fabric supported by a glass substrate and a thin film of polymer was formed using a manual film applicator with a gate height of 300 μm. Immediately afterwards, the polymer film was transferred to a 1 M sodium hydroxide (pH 14) coagulation bath, and left until complete precipitation into a white film. The precipitated polymer film was then moved to a demiwater bath (pH 5.5) for rinsing and storage.

Another P4VP-PS film (film 4) was produced according to the above described method with the difference that the P4VP-PS was added to water without any additive.

The membranes can be subjected to chemical crosslinking reactions to improve their mechanical stability. To do this, first, the membranes were dried overnight in air, then transferred to a sealable glass vessel and immersed in a solution of n-hexane containing the crosslinker 1,4 dibromobutane (DB) (in varying concentrations (e.g. 0.5, 2.0 or 4.0 v/v %) to achieve different degrees of crosslinking. The solution was heated to 60° C. with slow stirring using a magnetic stirrer bar; a temperature sensor was immersed in the solution to control the heating. The crosslinking reaction was allowed to proceed for a given time (e.g. 1 h). Afterwards, the crosslinked membranes were rinsed with n-hexane and water, and placed in a demiwater bath (pH 5.5) for storage.

SEM Characterization

Scanning electron microscopy (SEM, JEOL JSM 6010LA, operated at an acceleration voltage of 5 kV) was used to study the morphology of the membranes. For cross-section analysis, the samples were fractured in liquid nitrogen, mounted in cross-section holders with adhesive carbon tape and dried overnight in a vacuum oven at 30° C. Before SEM analysis, the samples were coated with a 10 nm conducting layer of chromium using a Quorum Technologies Q150T sputter coater. The SEM images of the films presented as FIGS. 2a, b, c and d and correspond to respectively film 1, 2, 3 and 4.

Mechanical Strength

The mechanical strength of the porous films was investigated by immersing the films in water and by carefully putting slowly increasing manual mechanical stress on the membrane. The test was performed blind. From this test the copolymer based films (P4VP-PS and P4VP-PBMA) were found to be more resistant to tearing and thus stronger compared to the homopolymer film (P4VP). The copolymer based porous films deform more before tearing, compared to homopolymer.

Results

Figure 2:
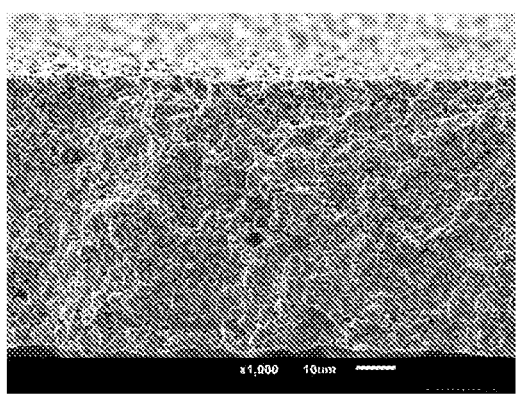
FIG. 2: SEM pictures of films 1-4. A and B: SEM picture of film 1 (P4VP with acetic acid), C and D: SEM picture of film 2 (P4VP-PS (9:1) with acetic acid), E and F: SEM picture of film 3 (P4VP-PBMA (9:1) with acetic acid), and G and H: SEM pictures of film 4 (P4VP-PS (9:1) without acetic acid).
Figure 2:
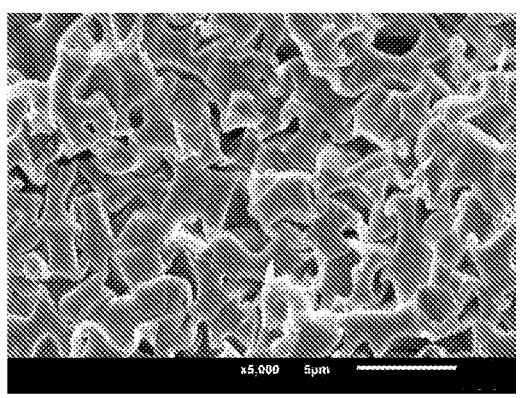
Figure 2:
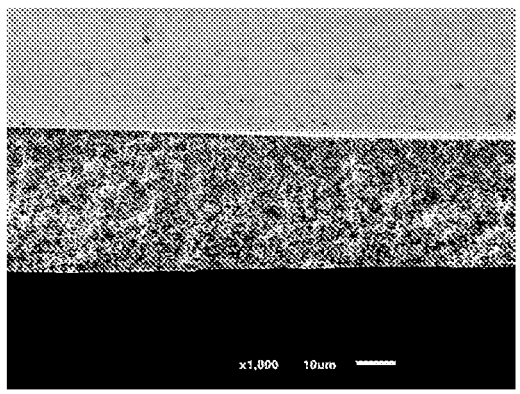
Figure 2:
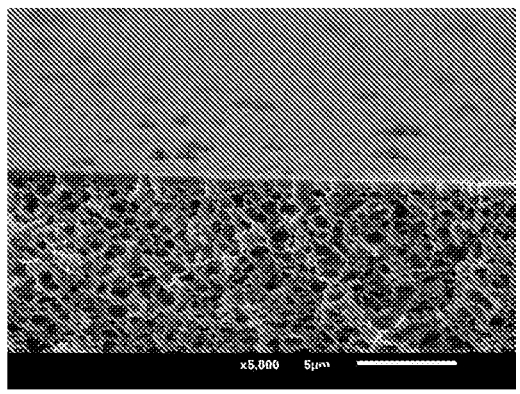
Figure 2:
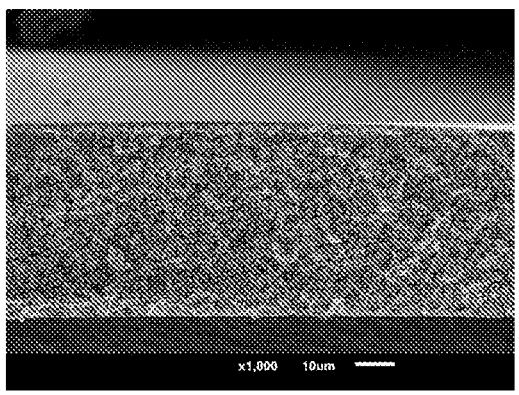
Figure 2:
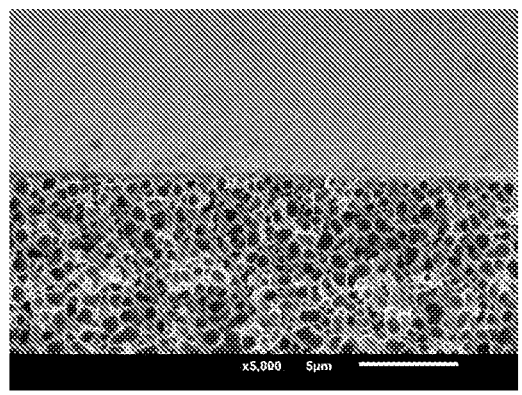
Figure 2:
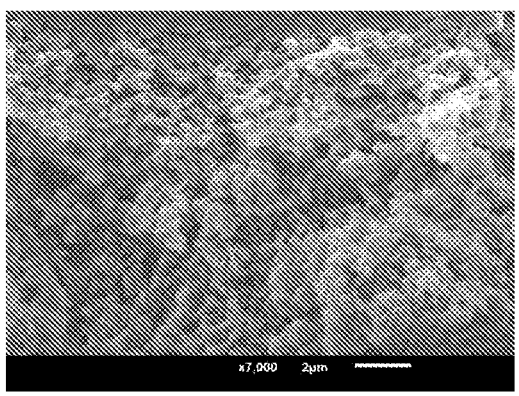
Figure 2:
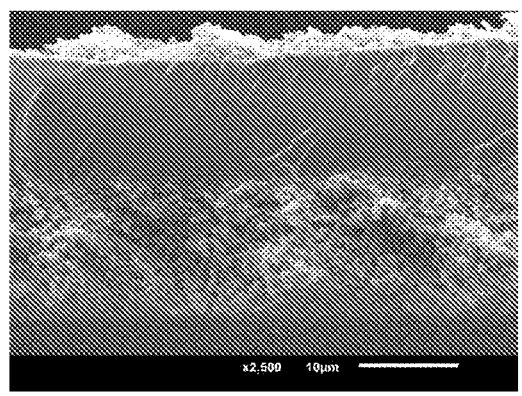

FIGS. 2A and B show that porous films of P4VP (film 1) can be prepared using an aqueous phase separation approach. A clear downside of this approach is that the porous film is mechanically weak.

FIGS. 2C and D show a porous film of a random co-polymer of P4VP-PS (film 2) that appears to be similar to the homopolymer porous films. This porous film shows improved mechanical properties compared to film 1. The hydrophobic PS strengthens the material when immersed in water.

FIGS. 2E and F show a porous film of a random co-polymer of P4VP-PBMA (film 3). This porous film shows improved mechanical properties compared to film 1.

FIGS. 2G and H show a porous film of a random co-polymer of P4VP-PS (film 4). This porous film also shows improved mechanical properties over film 1.

All films could be successfully crosslinked as described above, leading to further improved mechanical properties.

Example 2: Aqueous Phase Separation to Produce Porous Films from Co-Polymers Containing acrylic acid as the Responsive Monomer Materials Poly(styrene-alt-maleic acid) sodium salt solution 13% (PSaMA, MW: 350,000 Da), Poly(styrene-co-maleic acid), (PSMA, MW: 65,000 Da), Polyethylene glycol 400 (PEG, MW: 400 Da), Polyethylenimine, branched average Mn 600 Da (PEI 600), N-(3-Dimethylaminopropyl)-N'-ethylcarbodiimide hydrochloride (EDC), N-Hydroxysuccinimide (NHS), Sodium hydroxide, glacial acetic acid, sodium phosphate monobasic dihydrate, Phosphoric acid 85%, Hydrochloric acid 37%, Sulfuric acid 98% were bought from Sigma Aldrich and used as received. Sodium chloride was received from AkzoNobel, brand name Sanal® P. All water used was produced by a Millipore Synergy® Water Purification System.

The PSaMA was dried overnight at 100° C. in an oven to obtain the solid polymer which was then used without further purification to make the polymer casting solutions.

Membrane Preparation

The polymer casting solutions were prepared by mixing all components overnight followed by filtration over a Bekaert 25 µm Bekipor ST25 AL 3 steel filter. The solution was left for 24 hours to remove all the air bubbles.

The porous films were made the following way:

Film 5: A PSMA 18 w/v % solution was made in 0.8M NaOH. The solution was cast on a glass plate with 0.3 mm thickness and precipitated using a bath with 0.01 M H2SO4, 0.5M NaCl, IPA 30 v/v %. After 30 minutes it was rinsed and dried.

Film 6: A PSaMA 20 w/v % solution was made and cast on a glass plate with 0.3 mm thickness. It was precipitated using a bath with 1M H2SO4. After 30 minutes it was rinsed and dried.

Film 7: A PSaMA 16.67 w/v %, PEG 400 25 v/v % solution was made and cast on a glass plate with 0.6 mm thickness. It was precipitated using a bath with 0.5M H2SO4. After 30 minutes it was rinsed and dried.

Film 8: A PSaMA 20 w/v %, acetic acid 40 v/v % solution was made and cast on a glass plate with 0.3 mm thickness. It was precipitated using a bath with 2M acetic acid, 0.1 M NaCl and 0.04M HCl. After 30 minutes it was rinsed and crosslinked with the method detailed below.

Film 9: A PSaMA 20 w/v %, acetic acid 40 v/v % solution was made and cast on a glass plate with 0.3 mm thickness then left in a box for 1 hour at 60% humidity before it was put into the bath. It was precipitated using a bath with 2M Acetic acid, 0.1 M NaCl and 0.04M HCl. After 30 minutes it was rinsed and crosslinked with the method detailed below.

Film 10: A PSaMA 20 w/v %, acetic acid 40 v/v % solution was made and cast on a glass plate with 0.3 mm thickness. It was precipitated using a bath with 2M sodium phosphate monobasic dehydrate and 0.5M H3PO4. After 30 minutes it was rinsed and crosslinked with the method detailed below.

Film 11: A PS-PSS (50:50, Mw 19000) and PAH (Mw 150.000) solution (in total 16% wt polymer, mixed in a 1:2 ratio based on PSS:PAH monomers at pH 13) was made and cast on a glass plate with 0.3 mm thickness. It was precipitated using a bath with 4M sodium chloride at pH 1 and 0.05% glutaraldehyde (leading to crosslinking in the coagulation bath). After 30 minutes it was rinsed with water.

Crosslinking

Membranes were crosslinked by mixing EDC (2.5 g, 13.1 mmol), NHS (0.6 g, 5.2 mmol), PEI 600 (2.5 mL, 4.4 mmol) and HCl 37% (2.3 mL, 0.1 mmol) in 250 mL water. The membrane (240 cm2) was added to the mixture and left overnight. Afterwards, the membrane was washed twice with water and kept in water for storage.

Membrane Performance Test

The retention of film 5 was tested using a continuously stirred dead-end filtration cell under 4 bar of pressure with a 5 mM solution of MgSO4. A retention of 81% was measured with a permeability of 0.7 $L \cdot m^{-2} \cdot h^{-1} \cdot bar^{-1}$.

Pressure Test

Porous Film 10 was exposed to a nitrogen pressure of 20 bar, not leading to any observable damage to the porous film.

Results

Films 5-10 are all examples of the membranes that can be obtained with the method of the invention. With the SEM figures of film 5 (FIG. 3A), we demonstrate that it is possible to create a porous film from the random co-polymer PSMA using the method according to the invention.

Figure 3:
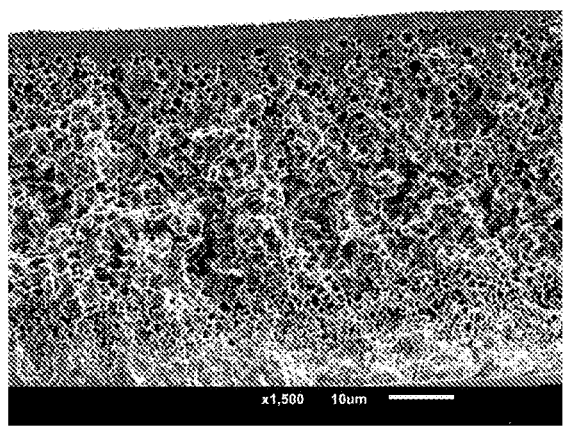
FIG. 3: SEM pictures of films 5-11. A: SEM picture of film 5 (PSMA in water with IPA), B: SEM picture of film 6 (PSaMA without additives), C: SEM picture of film 7 (PSaMA with PEG 400), D: SEM picture of film 8 (PSaMA with acetic acid), E: SEM picture of film 9 (PSaMA with acetic acid), F: SEM picture of film 10 (PSaMA with acetic acid and phosphoric acid), and G: SEM picture of film 11 (PS-PSS and PAH complex membrane).
Figure 3:
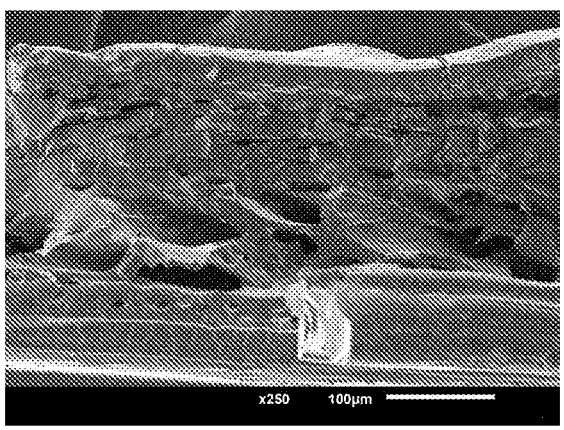
Figure 3:
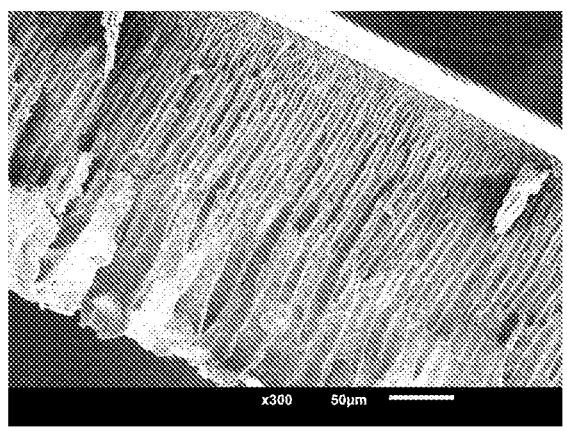
Figure 3:
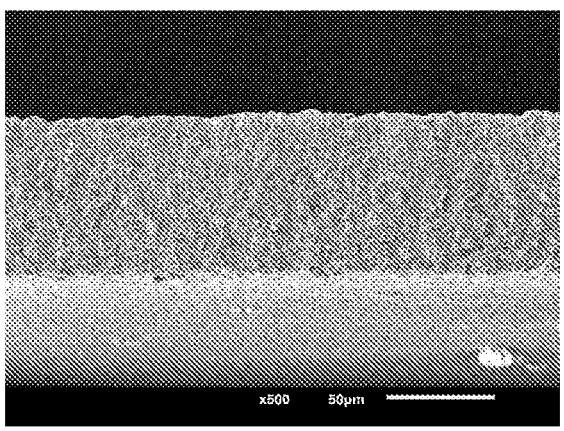
Figure 3:
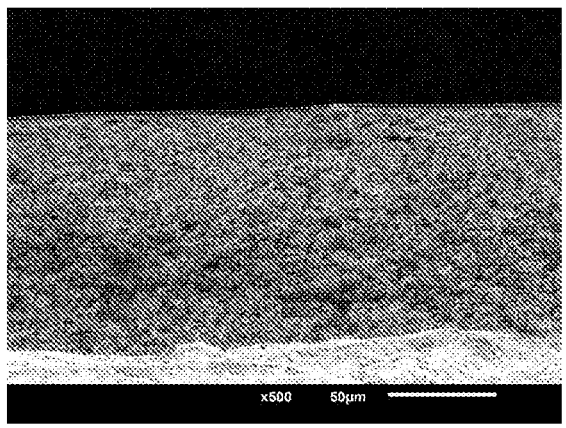
Figure 3:
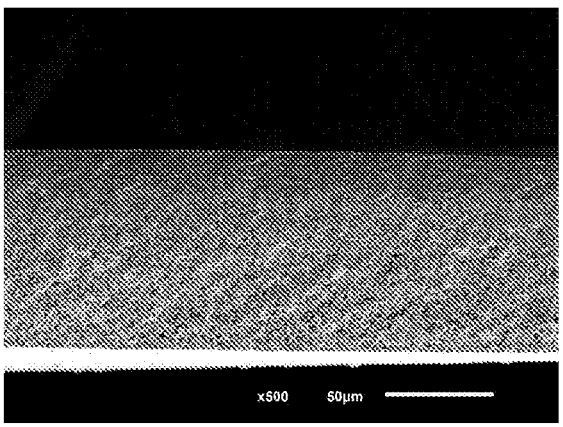
Figure 3:
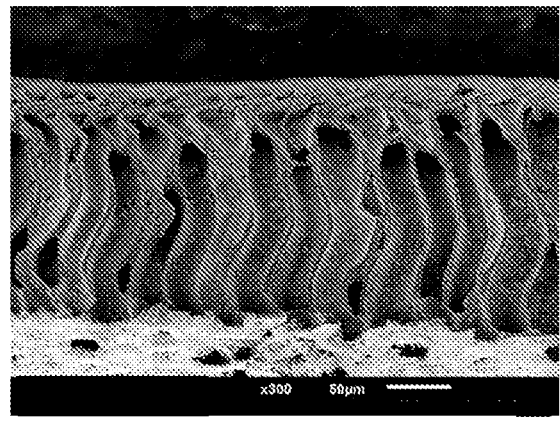

By taking an alternating co-polymer of the same monomers (PSaMA) it is also possible to create a porous film (film 6, FIG. 3B). The porous structure can be further improved by using a pore forming agent (PEG 400, film 7, FIG. 3C) or a weak acid (acetic acid (film 8, FIG. 3D and film 9, FIG. 3E)) as additive. The weak acid is believed to help control the kinetics of the phase separation leading to more well defined structure. Also phosphoric acid can be used as an additive in the precipitation bath, allowing additional control over the structure of the porous film (film 10, FIG. 3G).

Furthermore these figures demonstrate that a wide variety of porous structures can be prepared using water as the main solvent via the method of the invention. In film 8 a clear example of a symmetric porous film is shown (where the pores throughout the membrane have a similar size), while film 9 shows an asymmetric porous structure where the porous film has a thin dense top layer, below which the pores becoming increasingly increase in size when moving away from the top surface.

The porous film 9 was studied as a membrane. This film was able to retain 81% of MgSO4 clearly showing that this porous film can indeed function as a separation membrane.

The mechanical properties of film 10, prepared from the alternating co-polymer PSaMA, was found to be superior compared to the mechanical properties of film 5 prepared from the random co-polymer PSMA, but also compared to the mechanical properties of the P4VP and P4VP-PS (Film 1-4) based porous films.

Film 11 was producing using a responsive copolymer in combination with an oppositely charged homopolymer. Indeed, also this approach lead to the formation of a porous film.

All films could be successfully crosslinked as described above, leading to further improved mechanical properties.

The invention claimed is:

1. A method for creating a porous film through aqueous phase separation comprising:
  i) providing an aqueous solution comprising a responsive copolymer to form an aqueous copolymer solution, wherein the copolymer comprises a pH responsive monomer and a hydrophobic monomer, wherein said pH responsive monomer is selected from the group consisting of 2-diethylaminoethylmethacrylate (DEA), 4-vinylpyridinium (4VP), aminostyrene (AS), ethylene imine (EI), allylamine (AH), 2-(dimethylamino)ethyl methacrylate (DMAEMA), diallyl-dimethyl-ammonium chloride (DADMAC), (methacrylic acid) (MAA), acrylic acid (AA), maleic acid (MA), styrenesulfonate (SS), vinyl siloxane (VS), sulfonated polyethersulfone (sES), sulfonated polysulfone (sSU),
wherein said hydrophobic monomer is selected from the group consisting of styrene, ethylene, propylene, 1-hexene, 1-octene, 1-decene, 1-dodecene, 1-tetradecene, 1-octadecene, butadiene, isobutylene, tetrafluoroethylene, difluoroethylene, stilbene, acenapthylene, and
wherein the copolymer is an alternating copolymer;

ii) forming the aqueous copolymer solution into a thin layer and contacting the thin layer of aqueous copolymer solution with an aqueous coagulation solution having a lower pH or a higher pH compared to the aqueous copolymer solution, in which the responsive copolymer is not soluble; and iii) allowing solvent exchange between the aqueous copolymer solution and the aqueous coagulation solution to produce a porous film,
wherein the aqueous copolymer solution is predominantly water-based, wherein at least 50 vol % of solvent is water.

2. The method according to claim 1, further comprising:
iia) applying the aqueous copolymer solution comprising a responsive copolymer on a surface to create a coated surface, wherein the surface is coated with the aqueous copolymer solution; and
iib) immersing the coated surface in an aqueous coagulation bath comprising the aqueous coagulation solution in which the responsive copolymer is not soluble.

3. The method according to claim 1, further comprising:
iia) forming a tube of the aqueous copolymer solution comprising the responsive copolymer, wherein the tube is filled with the second aqueous copolymer solution; and
iib) immersing the tube of the aqueous solution comprising the responsive copolymer in an aqueous bath wherein the aqueous bath and/or the second aqueous copolymer solution in the tube comprises the aqueous coagulation solution in which the responsive copolymer is not soluble.

4. The method according to claim 1, wherein the aqueous copolymer solution further comprises a pore forming agent.

5. The method according to claim 4, wherein the pore forming agent is PEG with a Mw of 1-10 kg/mol.

6. The method according to claim 1, further comprising:
iv) crosslinking the porous film.

7. The method according to claim 6, wherein the crosslinking is via dihaloalkanes diamines, aldehydes, via an EDC (1-Ethyl-3-(3-dimethylaminopropyl)-carbodiimide) comprising crosslinking agent, via heating of the porous film, or via radiation such as an ion beam.

8. The method according to claim 2, wherein the surface is selected from the group consisting of a glass surface, a plastic surface, a ceramic surface, a metal surface, a porous surface, and surfaces that are preformed membranes of membrane materials known in the art.

9. The method according to claim 2, wherein applying the aqueous copolymer solution comprising a responsive copolymer to create a coated surface is performed by casting, drop casting, spin coating, dip coating, printing, stamping, spraying, or pouring.

10. The method according to claim 3, wherein the tube of the aqueous copolymer solution comprising a responsive copolymer is formed using a spinneret.

11. The method according to claim 1, wherein the aqueous copolymer solution comprising a responsive copolymer, and optionally a charged polymer, further comprises additives, wherein the additives are selected from the group consisting of a polypeptide, an oligonucleotide, a nanoparticle, a macromolecule, and/or a small molecule catalyst.

12. The method according to claim 1, wherein the porous film is a porous membrane or a porous hollow fibre membrane.

13. The method according to claim 1, wherein the alternating copolymer is selected from the group consisting of poly(styrene-alt-maleic acid) (PSaMA), poly(styrene-alt-acrylic acid) (PS-alt-AA), poly(styrene-alt-methacrylic acid) (PS-alt-MAA), poly(styrene-alt-4-vinylpyridine) (PS-alt-4VP), poly(styrene-alt-allylamine) (PS-alt-ALA), poly(styrene-alt-4-aminostyrene) (PS-alt-4AS), poly(stilbene-alt-maleic acid) (PSB-alt-MA), poly(stilbene-alt-acrylic acid) (PSB-alt-AA), poly(stilbene-alt-4-vinylpyridine) (PSB-alt-4VP), poly(stilbene-alt-allylamine) (PSB-alt-ALA), poly(stilbene-alt-4-aminostyrene) (PSB-alt-4AS), poly(acenapthylene-alt-maleic acid) (PAN-alt-MA), poly(acenapthylene-alt-acrylic acid) (PAN-alt-AA), poly(acenapthylene-alt-allylamine) (PAN-alt-ALA), poly(acenapthylene-alt-4-aminostyrene) (PAN-alt-4AS), poly(isobutylene-alt-maleic acid) (PIB-alt-MA), poly(isobutylene-alt-acrylic acid) (PIB-alt-AA), poly(isobutylene-alt-methacrylic acid) (PIB-alt-MAA), poly(isobutylene-alt-4-vinylpyridine) (PIB-alt-4VP), poly(isobutylene-alt-allylamine) (PIB-alt-ALA), poly(isobutylene-alt-4-aminostyrene (PIB-alt-4AS), poly(1-octadecene-alt-maleic acid) (POD-alt-MA), poly(1-octadecene-alt-acrylic acid) (POD-alt-AA), poly(1-octadecene-alt-methacrylic acid) (POD-alt-MAA), poly(1-octadecene-alt-4-vinylpyridine) (POD-alt-4VP), poly(1-octadecene-alt-allylamine) (POD-alt-ALA), poly(1-octadecene-alt-4-aminostyrene (POD-alt-4AS), poly(1-tetradecene-alt-maleic acid) (PTD-alt-MA), poly(1-tetradecene-alt-acrylic acid) (PTD-alt-AA), poly(1-tetradecene-alt-methacrylic acid) (PTD-alt-MAA), poly(1-tetradecene-alt-4-vinylpyridine) (PTD-alt-4VP), poly(1-tetradecene-alt-allylamine) (PTD-alt-ALA), poly(1-tetradecene-alt-4-aminostyrene (PTD-alt-4AS), poly(1-dodecene-alt-maleic acid) (PDD-alt-MA), poly(1-dodecene-alt-acrylic acid) (PDD-alt-AA), poly(1-dodecene-alt-methacrylic acid) (PDD-alt-MAA), poly(1-dodecene-alt-4-vinylpyridine) (PDD-alt-4VP), poly(1-dodecene-alt-allylamine) (PDD-alt-ALA), poly(1-dodecene-alt-4-aminostyrene (PDD-alt-4AS), poly(1-decene-alt-maleic acid) (PD-alt-MA), poly(1-decene-alt-acrylic acid) (PD-alt-AA), poly(1-decene-alt-methacrylic acid) (PD-alt-MAA), poly(1-decene-alt-4-vinylpyridine) (PD-alt-4VP), poly(1-decene-alt-allylamine) (PD-alt-ALA), poly(1-decene-alt-4-aminostyrene (PD-alt-4AS), poly(1-octene-alt-maleic acid) (PO-alt-MA), poly(1-octene-alt-acrylic acid) (PO-alt-AA), poly(1-octene-alt-methacrylic acid) (PO-alt-MAA), poly(1-octene-alt-4-vinylpyridine) (PO-alt-4VP), poly(1-octene-alt-allylamine) (PO-alt-ALA), poly(1-octene-alt-4-aminostyrene (PO-alt-4AS), poly(1-hexene-alt-maleic acid) (PH-alt-MA), poly(1-hexene-alt-acrylic acid) (PH-alt-AA), poly(1-hexene-alt-methacrylic acid) (PH-alt-MAA), poly(1-hexene-alt-4-vinylpyridine) (PH-alt-4VP), poly(1-hexene-alt-allylamine) (PH-alt-ALA), poly(1-hexene-alt-4-aminostyrene (PH-alt-4AS), poly(propylene-alt-maleic acid) (PP-alt-MA), poly(propylene-alt-acrylic acid) (PP-alt-AA), poly(propylene-alt-methacrylic acid) (PP-alt-MAA), poly(propylene-alt-4-vinylpyridine) (PP-alt-4VP), poly(propylene-alt-allylamine) (PP-alt-ALA), poly(propylene-alt-4- aminostyrene (PP-alt-4AS), poly(ethylene-alt-maleic acid) (PE-alt-MA), poly(ethylene-alt-acrylic acid) (PE-alt-AA), poly(ethylene-alt-methacrylic acid) (PE-alt-MAA), poly(ethylene-alt-4-vinylpyridine) (PE-alt-4VP), poly(ethylene-alt-allylamine) (PE-alt-ALA), poly(ethylene-alt-4-aminostyrene (PE-alt-4AS), poly(tetrafluoroethylene-alt-maleic acid) (PTFE-alt-MA), poly(tetrafluoroethylene-alt-acrylic acid) (PTFE-alt-AA), poly(tetrafluoroethylene-alt-4-vinylpyridine) (PTFE-alt-4VP), poly(tetrafluoroethylene-alt-allylamine) (PTFE-alt-ALA), poly(tetrafluoroethylene-alt-4-aminostyrene (PTFE-alt-4AS), poly(difluoroethylene-alt-maleic acid) (PDFE-alt-MA), poly(difluoroethylene-alt-acrylic acid) (PDFE-alt-AA), poly(difluoroethylene-alt-methacrylic acid) (PDFE-alt-MAA), poly(difluoroethylene-alt-4-vinylpyridine) (PDFE-alt-4VP), poly(difluoroethylene-alt-allylamine) (PDFE-alt-ALA), poly(difluoroethylene-alt-4-aminostyrene (PDFE-alt-4AS), poly(butadiene-alt-maleic acid) (PBD-alt-MA), poly(butadiene-alt-acrylic acid) (PBD-alt-AA), poly(butadiene-alt-methacrylic acid) (PBD-alt-MAA), poly(butadiene-alt-4-vinylpyridine) (PBD-alt-4VP), poly(butadiene-alt-allylamine) (PBD-alt-ALA), or poly(butadiene-alt-4-aminostyrene (PBD-alt-4AS).

14. The method according to claim 1, wherein the alternating copolymer is poly(styrene-alt-maleic acid).

\* \* \* \* \*